United States Patent [19]
Gove et al.

[11] Patent Number: 5,526,051
[45] Date of Patent: Jun. 11, 1996

[54] DIGITAL TELEVISION SYSTEM

[75] Inventors: Robert J. Gove, Plano; Stephen W. Marshall, Richardson; Vishal Markandey, Dallas; Donald B. Doherty, Irving; Richard C. Meyer, Plano; Scott D. Heimbuch, Dallas, all of Tex.

[73] Assignee: Texas Instruments Incorporated, Dallas, Tex.

[21] Appl. No.: 147,249

[22] Filed: Oct. 27, 1993

[51] Int. Cl.[6] .............................. H04N 5/907; H04N 7/12
[52] U.S. Cl. ............................................ 348/388; 348/721
[58] Field of Search ...................................... 348/388, 721, 348/750, 720; H04N 5/907, 7/12

[56] References Cited

U.S. PATENT DOCUMENTS

| | | | |
|---|---|---|---|
| 4,363,104 | 12/1982 | Nussmeier | 348/721 |
| 4,668,985 | 5/1987 | Kurashige et al. | 348/721 |
| 4,677,464 | 6/1987 | Yamaji et al. | 348/388 |
| 4,939,575 | 7/1990 | Childers | 358/160 |
| 4,942,470 | 7/1990 | Nishitani et al. | 348/721 |
| 5,027,193 | 6/1991 | Kani et al. | 348/388 |
| 5,079,544 | 1/1992 | DeMond et al. | 340/701 |
| 5,115,309 | 5/1992 | Hang | 348/388 |

FOREIGN PATENT DOCUMENTS 31282 2/1988 Japan ............................ H04N 5/905

OTHER PUBLICATIONS

Hiroshi Miyaguchi, et al, *Digital TV With Serial Video Processor*, IEEE Transactions on Consumer Electronics, vol. 36, No. 3, Aug. 1990, 318–326.

Masafumi Yugami, et al, *EDTV With Scan–Line Video Processor*, IEEE Transactions on Consumer Electronics, vol. 38, No. 3, Aug. 1992, 553–562.

*Primary Examiner*—James J. Groody
*Assistant Examiner*—Glenton B. Burgess
*Attorney, Agent, or Firm*—Julie L. Reed; Richard L. Donaldson; Rene E. Grossman

[57] ABSTRACT

A digital television system (10) is provided. System (10) may receive a video signal at composite video interface and separation circuit (16). The video signal is separated into separate video signals by composite video interface and separation circuit (16). The separate video signals are converted to digital video signals in analog to digital converter circuit (18). Line slicer (14) divides each line of digital video signal into a plurality of channels such that each channel may be processed in parallel by channel signal processors (22a) through (22d). Each channel signal processor (22a) through (22d) may provide two lines of output for each line of video input. The processed digital video signals may be formatted for displays (26a) through (26c) in formatters (24a) through (24c).

32 Claims, 11 Drawing Sheets

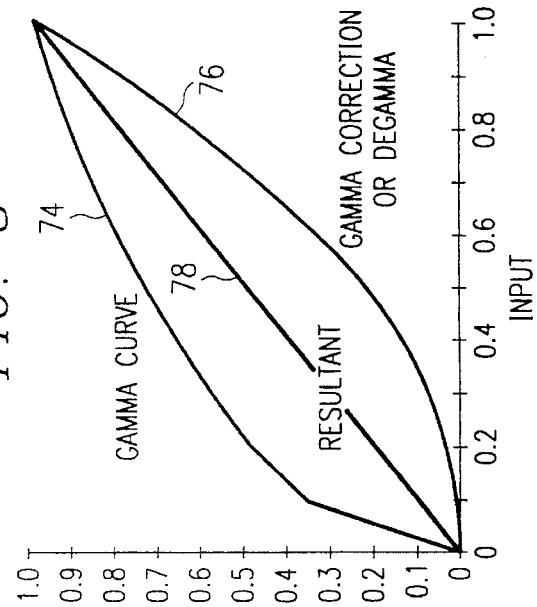
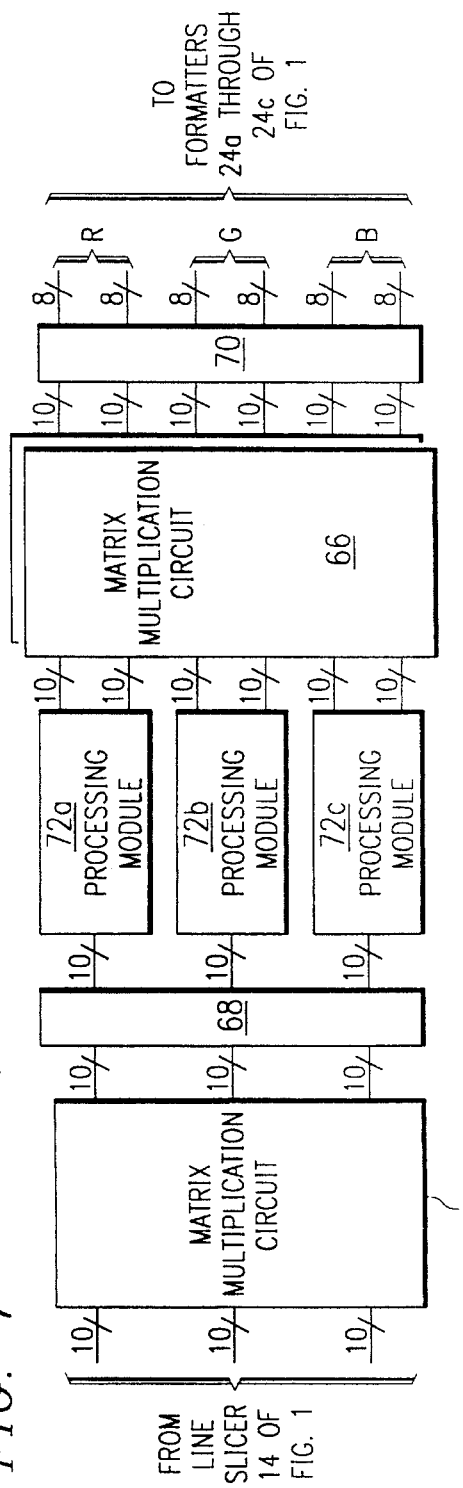
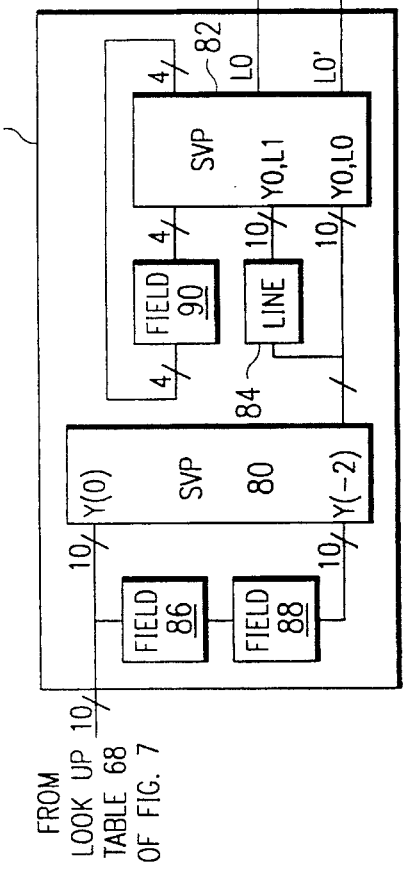

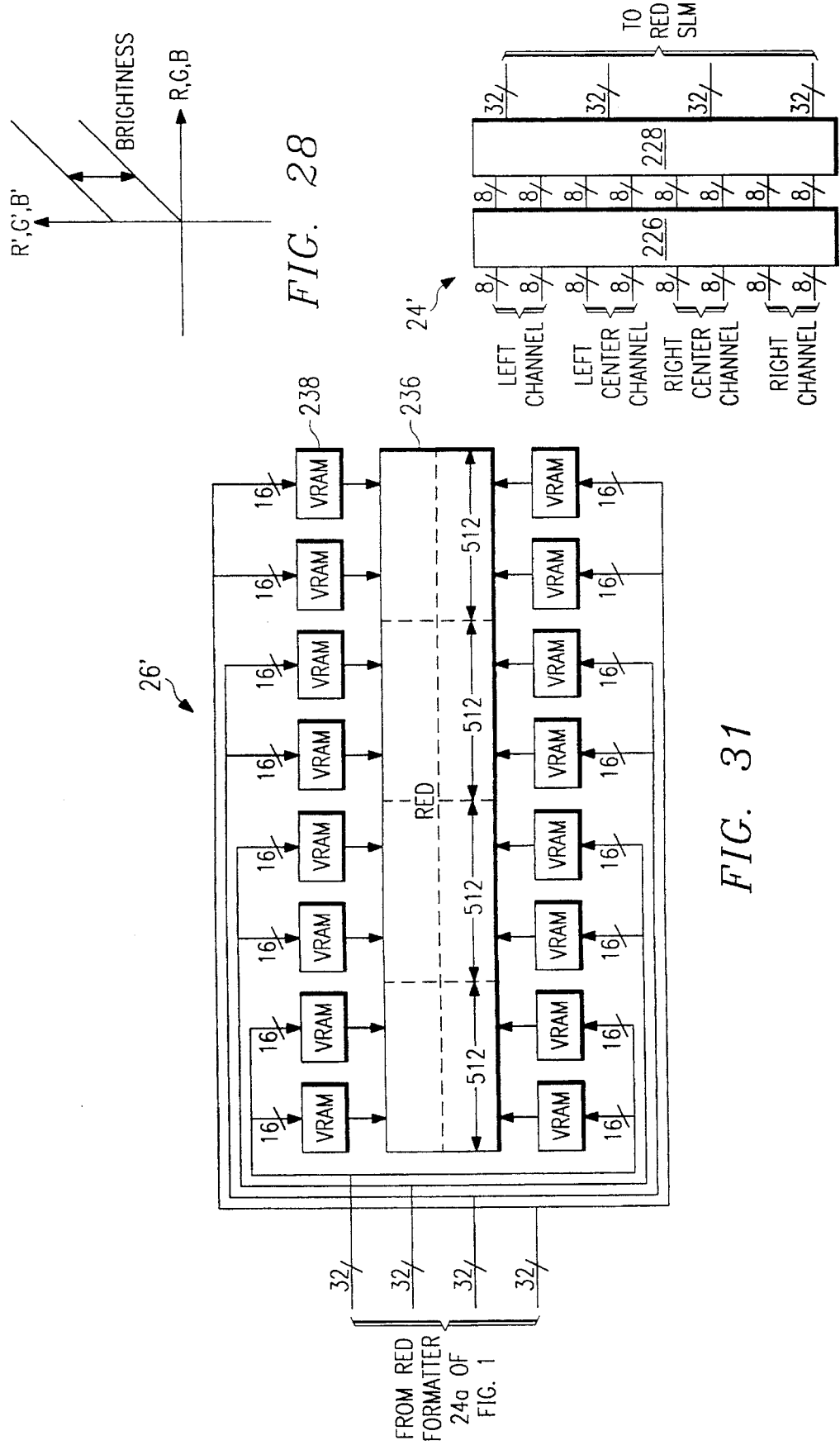

DIGITAL TELEVISION SYSTEM

CROSS REFERENCE TO RELATED PATENTS AND APPLICATIONS

The following patent applications are related to the present application, and are incorporated by reference herein:

U.S. Pat. No. 4,615,595, entitled, "FRAME ADDRESSED SPATIAL LIGHT MODULATOR";

U.S. Pat. No. 5,079,544, entitled, "STANDARD INDEPENDENT DIGITIZED VIDEO SYSTEM";

U.S. Pat. No. 4,939,575, entitled, "FAULT-TOLERANT SERIAL VIDEO PROCESSOR DEVICE";

U.S. Ser. No. 07/678,761, Atty Docket No. TI-15721 "DMD ARCHITECTURE AND TIMING FOR USE IN A PULSE-WIDTH MODULATED DISPLAY SYSTEM";

U.S. Ser. No. 08/148,768; "VIDEO DATA FORMATTER FOR A DIGITAL TELEVISION SYSTEM"; and U.S. Ser. No. 08/147,801 "SYSTEM AND METHOD FOR PACKING DATA INTO VIDEO PROCESSOR".

TECHNICAL FIELD OF THE INVENTION

This invention relates in general to the field of electronic devices. More particularly, this invention relates to a digital television system.

BACKGROUND OF THE INVENTION

Standard television has not kept up with the modern electronic revolution as exemplified by the recent developments in the personal computer industry. Consequently, a standard television system does not produce as high a quality picture as one might expect given the recent advancements seen in other modern electronic systems.

Standard television systems may receive and display analog, rather than digital, video signals. A typical standard video signal is referred to as an "interlaced" video signal. This means that each frame of video data displayed on the standard system is divided into two fields. The first field may, for example, contain the odd lines of the video frame. The second field may contain the even lines of the same video frame. The two fields making up the single frame are received and displayed successively on the standard system and may appear to a viewer as a single frame. Dividing and displaying a video frame in this manner may decrease the quality of the output of a video system.

Additionally, a standard television system may include an analog display such as a cathode ray tube (hereinafter "CRT"). Because a CRT is an analog device that does not provide a linear response to an input signal, a "gamma curve" is introduced into a standard video signal to compensate for the non-linearity of the CRT. Standard video signals therefore are not directly compatible with a linear digital display.

Furthermore, a standard television system may not be operable to process a video signal prior to displaying the video signal. Similarly, a standard television system may not be programmable to operate on a number of different standard video signals. Finally, a standard television system may be limited to a small display area on the order of 640 by 480 pixels.

SUMMARY OF THE INVENTION

In accordance with the present invention, a digital television system is provided which substantially eliminates or reduces disadvantages and problems associated with prior systems. The teachings of the present invention provide a digital television system that processes video signals in a parallel architecture. A parallel architecture has not been previously used in a television system.

More specifically, the present invention provides a digital television system that may process input video signals in various forms. The system comprises circuitry that is operable to divide a line of input video signals into a plurality of channels for each input video signal. The channels of input video signals are processed in parallel. The processed video signals may be displayed on a display.

It is a technical advantage of the present invention to provide a digital television system that processes a video signal in a plurality of parallel channels. The channels of the system may correspond to vertical strips of a video frame. Each channel may contain an overlap of, for example, one to five pixels with an adjacent channel. The overlap between channels may allow identical horizontal processing of pixels on the ends of each channel. The overlapping pixels may be removed before the processed video signal is displayed such that redundant pixels are not displayed.

It is another technical advantage of the present invention to provide a digital television system that is operable to convert a standard video signal into a non-interlaced video signal. The system may convert each field of an interlaced video signal into a non-interlaced frame. Additionally, the system may remove the effect of a standard gamma curve from a standard video signal.

It is another technical advantage of the present invention to provide a digital television system including a digital display such as a spatial light modulator. The display may provide $2^x$ intensity levels in response to X bit planes formed for each of the video signals from video data for each pixel in a video frame. The first bit plane for each input video signal, corresponding to the most significant bit for each pixel, may control the display for one-half of the time for one frame. Successive bit planes may each control the display for a period of time proportionate to the position of the bits of that bit plane in the pixels making up that bit plane.

It is a technical advantage of the present invention to provide a programmable digital television system. The system may be programmed by a user to process a particular standard video signal. Additionally, the system may be programmed to implement various functions to produce a high definition display from a standard video signal input.

It is another technical advantage of the present invention to provide a digital television system that is operable to process red, green and blue video signals or a luminance video signal and two color difference video signals.

It is another technical advantage of the present invention to provide a digital television system that is operable to modify the size of a video frame. The system may expand the pixel width of a video frame by controlling the rate at which a line of video data is sampled. Additionally, the system may scale the number of lines in a video frame.

It is another technical advantage of the present invention to provide a digital television system with a large display area on the order of 2048 by 1152 pixels.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein:

FIG. 7 illustrates an embodiment of a channel signal process of FIG. 1 constructed according to the teachings of the present invention;

FIG. 8 illustrates a gamma correction function according to the teachings of the present invention;

FIG. 9 illustrates an embodiment of a processing module of FIG. 7 constructed according to the teachings of the present invention;

FIG. 28 is a graph illustrating the effect of the brightness function according to the teachings of the present invention;

FIG. 29 illustrates an embodiment of a formatter of FIG. 1 constructed to the teachings of the present invention;

FIG. 31 illustrates an embodiment of a display of FIG. 1 constructed according to the teaching of the present invention.

DETAILED DESCRIPTION OF THE INVENTION

Figure 1:
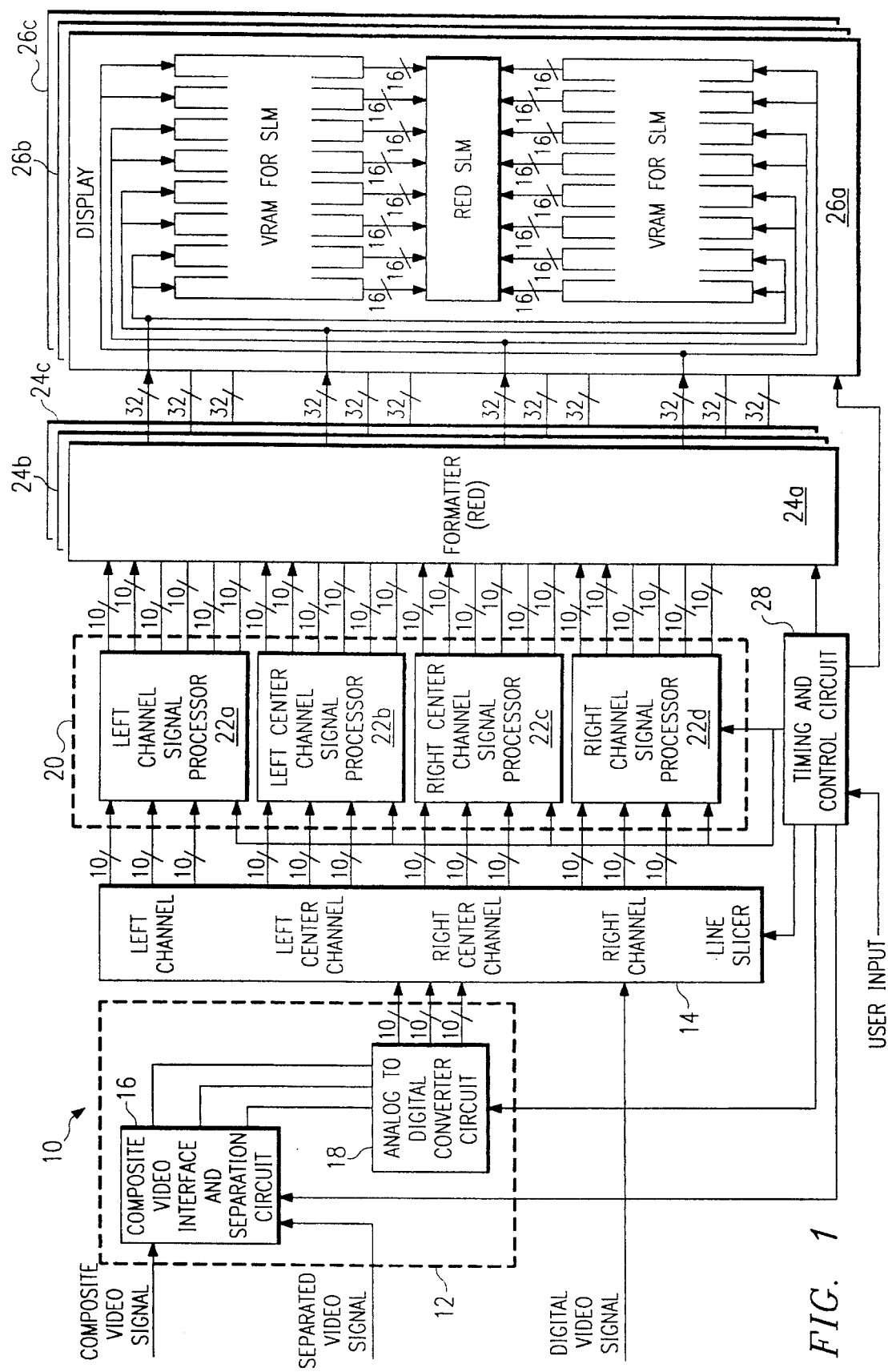
FIG. 1 illustrates a digital television system constructed according to the teachings of the present invention.

FIG. 1 illustrates a digital television system indicated generally at 10 and constructed according to the teachings of the present invention. System 10 comprises a parallel architecture wherein input video signals may be divided into channels to be processed in parallel. For example, system 10 may implement appropriate functions such that a standard video signal may be used to provide a high definition video display. Alternatively, system 10 may sample and display a high definition video signal.

System 10 may receive video signals in composite or component form. For example, system 10 may receive an analog composite video signal, an analog video signal in component form, or a digital video signal. System 10 may convert a composite video signal into a plurality of video signals for processing. For example, an analog composite video signal in the format established by the National Television Standards Committee (hereinafter "NTSC") may be separated into a luminance signal, identified by the symbol Y, and two color difference signals, identified by the symbols I and Q. Alternatively, system 10 may separate other standard composite video signals into appropriate video signals for processing according to Table 1 below.

TABLE 1

| Input Video Format | Color Space Domain |
| --- | --- |
| NTSC | Y, I, Q |
| PAL and SECAM | Y, U, V |
| SMPTE 240M, SMPTE 260M | Y, Pr, Pb |

It is noted that the other standard video formats include: Phase Alternating Line, hereinafter "PAL"; Sequential Color with Memory, hereinafter "SECAM"; and Society of Motion Picture Engineers, hereinafter "SMPTE".

Each of these standard video signals comprise a luminance signal, hereinafter "luma" or "Y" and a chrominance signal, hereinafter "chroma" or "C". The chroma signal may be further divided into appropriate color difference signals as shown in Table 1. For clarity, each of the standard video signals may hereinafter be referred to as providing a video signal in a "color difference color space" or a "Y-I-Q color space." As an alternative to the standard video signals of Table 1, a video source may be coupled to system 10 to provide a red video signal, hereinafter "R" a green video signal, hereinafter "G" and a blue video signal, hereinafter "B". Such a video source may hereinafter be referred to as providing a video signal in an "R-G-B color space."

System 10 prepares a video signal for parallel processing in receiving circuitry 12, and line slicer 14. Receiving circuitry 12 may receive, for example, a composite video signal in the NTSC format from an external source (not explicitly shown). Alternatively, receiving circuitry 12 may receive separate Y and C video signals. Furthermore, receiving circuitry 12 may receive separate video signals in an R-G-B color space.

Receiving circuitry 12 comprises composite video interface and separation circuit 16 coupled to analog to digital converter circuit 18. Composite video interface and separation circuit 16 may separate a composite video signal into, for example, three separate video signals. Analog to digital converter circuit 18 may convert each of the separate video signals into ten bit digital video signals. Analog to digital converter circuit 18 of receiving circuitry 12 is coupled to provide three ten bit digital video signals to line slicer 14. Additionally, a digital video signal may be coupled directly to line slicer 14.

Line slicer 14 divides each digital video signal into a plurality of separate channels for each line of composite video signal. For example, line slicer 14 may divide each digital video signal into four, five or another appropriate number of channels. The number of channels may depend on the number of pixels in a line of video signal, and the number of pixels that may be simultaneously processed by a video signal processor of system 10. Line slicer 14 may provide appropriate overlap between the various channels for processing as described below.

System 10 processes the digital video signals in processing circuitry 20. Processing circuitry 20 is coupled to line slicer 14. Processing circuitry 20 comprises a plurality of channel signal processors 22a through 22d. The number of channel signal processors 22 may be equal to the number of channels provided by line slicer 14. Each channel signal processor 22a through 22d receives all three 10 bit digital video signals for the channel corresponding to that signal processor 22a through 22d. Processing circuitry 20 may convert each line of digital video signal into two lines of digital video signal output. Each channel signal processor 22a through 22d, therefore, may have six separate outputs, for example, two ten bit red outputs, two ten bit green outputs, and two ten bit blue outputs. Additionally, processing circuitry 20 may perform the following functions: color space conversion, gamma correction, and picture quality control which will be described in detail below.

System 10 reconnects and displays the processed video data. A plurality of formatters 24a through 24c reconnect the video data and a plurality of displays 26a through 26c display the video data. One formatter 24a through 24c and one display 26a through 26c operate on a different digital video signal as indicated in FIG. 1. For example, formatter 24a and display 26a may operate on a red video signal. Formatter 24b and display 26b may operate on a green video signal. Finally, formatter 24c and display 26c may operate on a blue video signal.

Two ten bit outputs of each channel signal processor 22a through 22d are coupled to an appropriate formatter 24a through 24c. Formatters 24a through 24c remove overlap between adjacent channels, reconnect the channels, and prepare the reconnected digital video signals for display on displays 26a through 26c. Formatters 24a through 24c each provide 128 bit words in four 32 bit channels to displays 26a through 26c. Displays 26a through 26c may comprise, for example, a Spatial Light Modulator (hereinafter "SLM") such as a 2×128 pin Digital Micromirror Device (hereinafter "DMD") produced by TEXAS INSTRUMENTS INCORPORATED. However, displays 26a through 26c are not limited to digital displays. It is within the scope of the teachings of the present invention for the processed video signal to be displayed on an analog display.

Timing and control circuit 28 is coupled to composite video interface and separation circuit 16, analog to digital converter circuit 18, line slicer 14, processing circuitry 20, formatters 24a through 24c, and displays 26a through 26c. Timing and control circuit 28 is operable to control the timing of each aspect of system 10. The timing of system 10 may be accomplished through use of a synchronization (hereinafter "sync") signal supplied to timing and control circuit 28 by composite video interface and separation circuit 16. Additionally, timing and control circuit 28 is operable to accept user inputs to control the timing of various functions of system 10. For example, timing and control circuit 28 may receive user inputs to select the type of input video signal coupled to receiving circuitry 12. Furthermore, timing and control circuit 28 may accept information for processing circuitry 20 such as a scaling factor, a gamma correction factor, the desired processing method, and picture control functions; each of which are described more fully below. Furthermore, timing and control circuit 28 may receive a specific sampling rate for analog to digital converter circuit 18.

In operation, system 10 may prepare a standard video signal to produce a high definition display. As described previously, system 10 may receive analog or digital video signals in composite or separated form. For conciseness, the operation of system 10 is described in conjunction with receiving an analog composite video signal. System 10 separates a composite video signal into video signals, divides the video signals into a plurality of channels, and processes the channels in parallel. An advantage of using a parallel architecture in system 10 is that system 10 is able to process the video signals at a low speed while providing a high definition display. Consequently, system 10 may incorporate existing video processor components.

Composite video interface and separation circuit 16 separates the composite video signal into, for example, three separate video signals. Composite video interface and separation circuit 16 may, for example, separate a composite video signal into Y, I, and Q video signals of the NTSC standard.

Analog to digital converter circuit 18 may sample each video signal at a frequency of, for example, 71.1 MHz. The appropriate sampling rate may depend on the number of pixels allocated for a line of video on displays 26a through 26c, and the time for one line of video signal to be received by receiving circuitry 12. Therefore, the sampling rate may be adjusted to create a predetermined number of pixels for each line of video signal. Analog to digital converter circuit 18 may comprise, for example, Analog to Digital Converter board AD9060 produced by ANALOG DEVICES. Alternatively, analog to digital converter circuit 18 may comprise another appropriate analog to digital converter device operable to sample data at an appropriate sampling rate on the order of 75 MHz.

Figure 2:
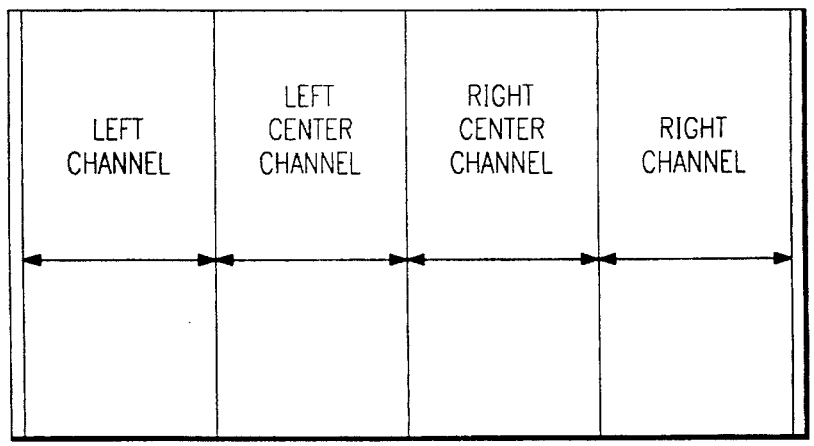
FIG. 2 illustrates four vertical strips created by the system of FIG. 1.

Line slicer 14 divides each digital video signal into a plurality of separate channels for each line of video signal. For example, line slicer 14 may divide each line of the digital video signal into four channels so that the video signal may be processed in parallel. By dividing each line of digital video signal in the same manner, each channel signal processor 22a through 22d effectively processes one vertical strip of each video frame. FIG. 2 shows the four vertical strips processed by channel signal processors 22a through 22d for the embodiment of FIG. 1. Alternatively, line slicer 14 may divide a line on a pixel by pixel basis or line slicer 14 may divide a video frame into horizontal strips. An advantage of dividing a video frame into vertical strips is that the related processing steps performed by processing circuitry 20 are simplified.

Figure 3:
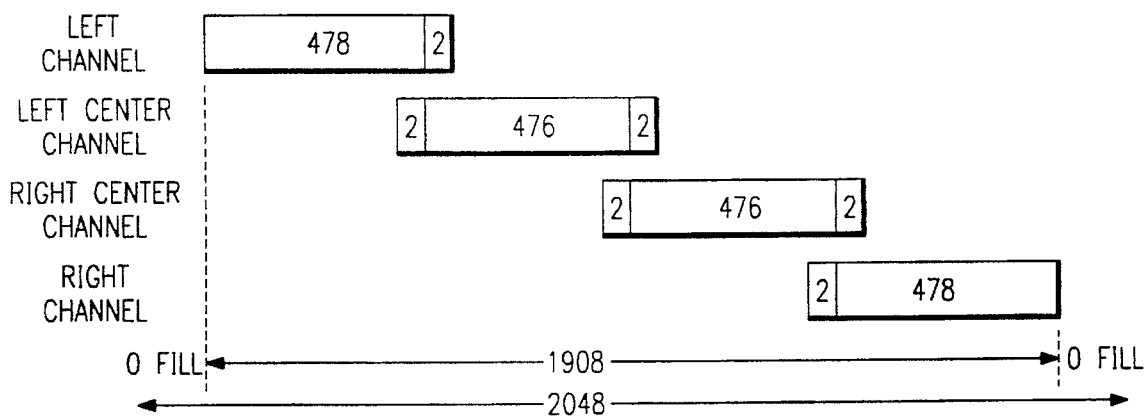
FIG. 3 illustrates the overlap in pixels between adjacent channels created by the system of FIG. 1.

Additionally, line slicer 14 may provide for overlap between the vertical channels by providing common pixels to adjacent channels as shown in FIG. 3. The overlap may comprise, for example, from one to five pixels. The overlapping pixels may be used to provide appropriate data for each channel to perform the various functions described below as called for by processing circuitry 20. The amount of overlap between channels may be varied depending of the specific functions implemented in processing circuitry 20.

System 10 processes the digital video signals in processing circuitry 20. Processing circuitry 20 may perform the progressive scan function (hereinafter "proscan"). Proscan "de-interlaces" a video signal by creating an entire video frame from a single or multiple video fields at the field rate. As described previously, a standard video signal may comprise two fields of video data for each frame. Additionally, processing circuitry 20 may convert the digital video signals into a different color space. For example, processing circuitry 20 may convert digital video signals from a color difference color space to an R-G-B color space. Furthermore, processing circuitry may remove a gamma curve from a standard video signal. Finally, processing circuitry 20 may control the quality of a video display in response to user inputs such as inputs for adjustments to brightness, hue, contrast, sharpness and saturation. Each of these functions is described in detail below.

System 10 reconnects and displays the processed digital video signal using formatters 24a through 24c and displays 26a through 26c. Formatters 24a through 24c remove overlap between adjacent channels. Additionally, formatters 24a through 24c prepare the reconnected digital video signals for display on displays 26a through 26c. For example, formatters 24a through 24c may produce a plurality of bit planes from the reconnected digital video signals. Each bit plane may correspond to a particular bit for each pixel in a particular video frame. In the embodiment of FIG. 1, formatters 24a through 24c each may produce 10 bit planes of video data for each separate video signal that are to be provided to displays 26a through 26c in 128 bit words. Based on the output of formatters 24a through 24c, displays 26a through 26c may project appropriate images corresponding to the processed video signals on, for example, a screen (not shown). The combination of the different video signals output by displays 24a through 24c result in a single, appropriately colored, image.

It should be understood that system 10 may be operable to be programmed to accept any appropriate standard analog or digital video signal. Alternatively, system 10 may be preprogrammed to accept only a limited number of appropriate standard analog or digital video signals.

A. Receiving Circuitry

1. Composite Video Interface and Separation Circuitry

Figure 4:
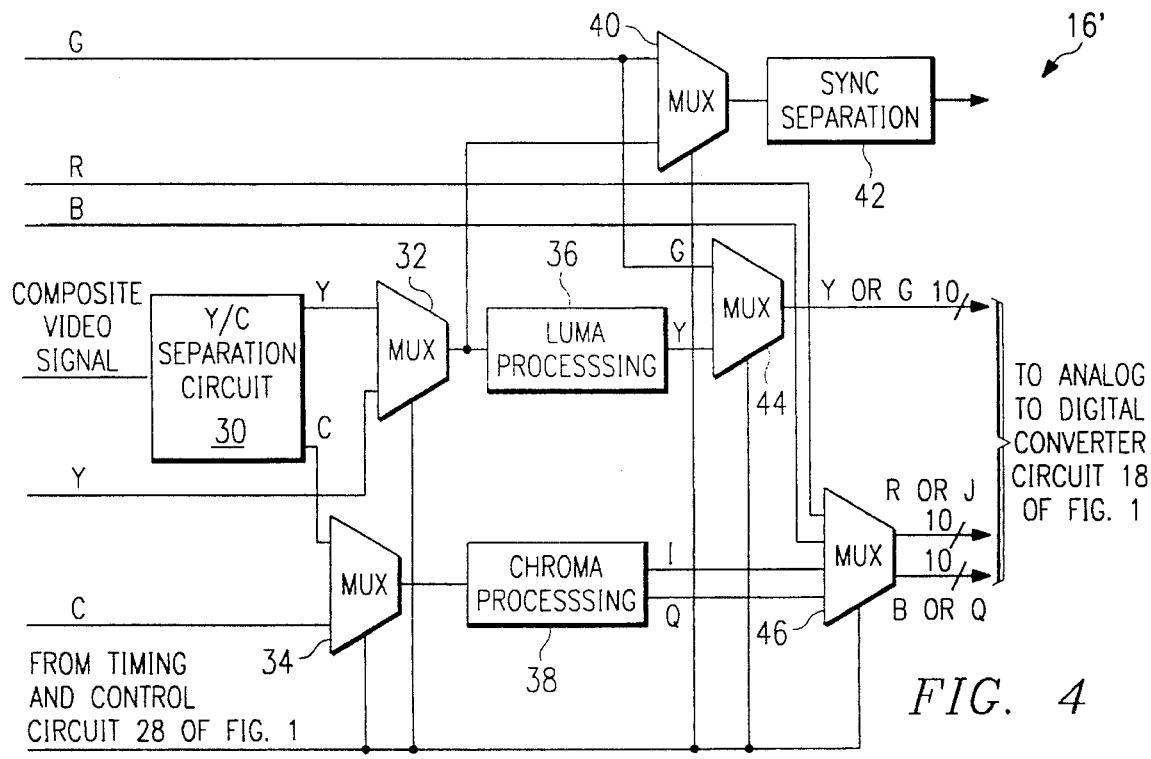
FIG. 4 illustrates an embodiment of the composite video interface and separation circuit of FIG. 1 constructed according to the teaching of the present invention.

FIG. 4 illustrates one embodiment of a composite video interface and separation circuit indicated generally at 16' and constructed according to the teachings of the present invention. Composite video interface and separation circuit 16' may comprise, for example, Y/C separation circuit 30, luma signal multiplexer 32, chroma signal multiplexer 34, luma processing circuit 36, chroma processing circuit 38, sync signal multiplexer 40, sync separation circuit 42, and first and second output multiplexers 44 and 46.

A composite video signal may be coupled to composite interface and separation circuit 16' at Y/C separation circuit 30. Y/C separation circuit 30 separates a standard composite video signal into a luma signal, Y, and a chroma signal, C. A Y output of Y/C separation circuit 30 is coupled to luma signal multiplexer 32. Additionally, a separated luma signal is also coupled to luma signal multiplexer 32. A C output of Y/C separation circuit 30 is coupled to chroma signal multiplexer 34. Additionally, a chroma signal is coupled to chroma signal multiplexer 34. Luma signal multiplexer 32 is coupled to luma processing circuit 36 and sync signal multiplexer 40. Additionally, the output of chroma signal multiplexer 34 is coupled to chroma processing circuit 38.

A refined luma signal is provided to first output multiplexer 44 by luma processing circuit 36. Additionally, a green video signal, G, is also coupled to first output multiplexer 44. The green video signal is also provided to sync signal multiplexer 40.

Chroma processing circuit 38 provides two color difference signals to second output multiplexer 46. A red video signal, R, and a blue video signal, B, are provided to second output multiplexer 46.

Finally, the output of signal multiplexer 40 is coupled to sync separation circuit 42. The output of each of luma signal multiplexer 32, chroma signal multiplexer 34, signal multiplexer 40, and first and second output multiplexers 44 and 46 are controlled by a signal from timing and control circuit 28 of FIG. 1.

In operation, a standard video signal, such as the standard video signals shown below in Table 2, may be prepared for processing by system 10 of FIG. 1 in composite video interface and separation circuit 16'.

TABLE 2

| Input Video Type | Input Format (Interlaced) |
| --- | --- |
| SMPTE 240 M | 1840 × 517 |
| NTSC | 640 × 241.5 |
| Wide NTSC # 853 | 853 × 241.5 |
| NTSC 4.43 | 640 × 241.5 |
| PAL | 768 × 288.5 |
| SECAM | 768 × 288.5 |
| Wide PAL # | 1024 × 288.5 |

A composite video signal is separated into Y and C video signals by Y/C separation circuit 30. The separated Y and C video signals may be passed to luma processing circuit 36 and chroma processing circuit 38 respectively by luma signal multiplexer 32 and chroma signal multiplexer 34.

Luma processing circuit 36 refines the Y video signal input and provides it to first output multiplexer 44. First output multiplexer 44 may provide the processed Y video signal to analog to digital converter circuit 18 of FIG. 1. Similarly, chroma processing circuit 38 converts the C video signal into two appropriate color difference signals, such as I and Q. The output color difference signals are provided to second output multiplexer 46. Second output multiplexer 46 may provide the color difference signals to analog to digital converter circuit 18 of FIG. 1.

Alternatively, composite video interface and separation circuit 16' may provide previously separated Y and C video signals to analog to digital converter circuit 18 of FIG. 1. A previously separated Y video signal may be provided to analog to digital converter circuit 18 of FIG. 1 by luma signal multiplexer 32, luma processing circuit 36, and first output multiplexer 44. Similarly, a previously separated C video signal may be provided to analog to digital converter circuit 18 of FIG. 1 by chroma signal multiplexer 34, chroma processing circuit 38 and second output multiplexer 46.

Finally, composite video interface and separation circuit 16' may provide component R, G and B signals to analog to digital converter circuit 18 of FIG. 1. As shown in FIG. 4, a G video signal is provided directly to first output multiplexer 44. Additionally, R and B video signals are provided directly to second output multiplexer 46. In response to an appropriate signal from timing and control circuit 28, first and second output multiplexers 44 and 46 provide R, G and B video signals to analog to digital converter circuit 18 of FIG. 1.

Composite video interface and separation circuit 16' may also remove a sync signal from an input video signal. For example, sync signal multiplexer 40 may provide either a Y video signal or a G video signal to sync separation circuit 42. Sync separation circuit 42 may remove a horizontal sync signal and a vertical sync signal from the video signal. Sync separation circuit 42 may provide the output sync signals to timing and control circuit 28 of FIG. 1. Timing and control circuit 28 may base the timing of each operation performed in system 10 on the sync signal removed from the video signal.

2. A/D Converter Circuit

Figure 5:
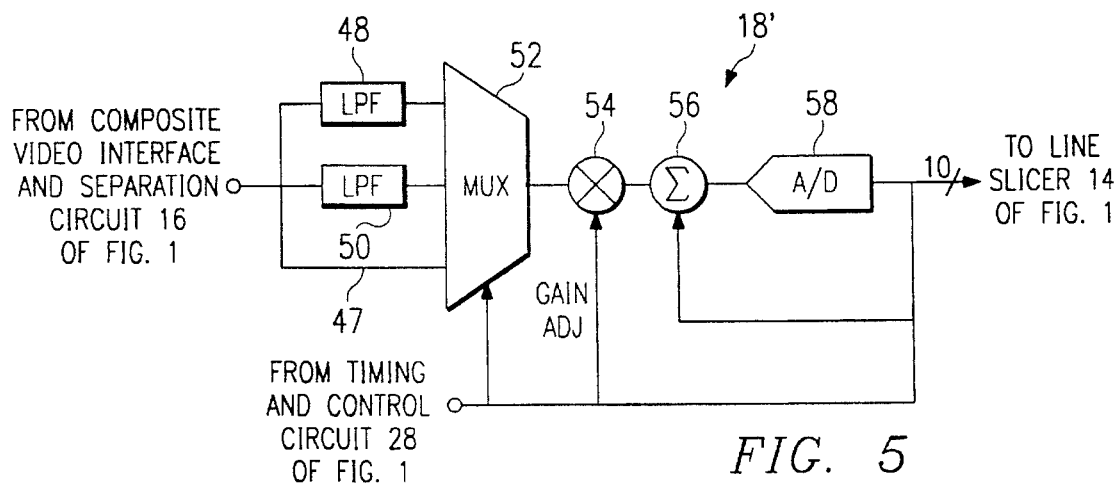
FIG. 5 illustrates an embodiment of the analog to digital converter circuit of FIG. 1 constructed according to the teachings of the present invention.

FIG. 5 illustrates an embodiment of an analog to digital converter circuit indicated generally at 18' and constructed according to the teachings of the present invention. FIG. 5 only illustrates one analog to digital converter of analog to digital converter circuit 18'. It is understood that analog to digital converter circuit 18 of FIG. 1 may comprise one analog to digital converter circuit 18' illustrated in FIG. 5 for each separate video signal to be processed by system 10 of FIG. 1. However, for conciseness, analog to digital converter circuit 18' will be described herein only in conjunction with the circuitry shown in FIG. 5 for converting one video signal from an analog signal to a digital signal.

Analog to digital converter circuit 18' comprises line 47, first low pass filter 48, second low pass filter 50, multiplexer 52, multiplier 54, adder 56, and A/D converter 58. A separated video signal from composite video interface and separation circuit 16 of FIG. 1 is coupled to first low pass filter 48, second low pass filter 50, and multiplexer 52. The output of first low pass filter 48 and second low pass filter 50 are also coupled to multiplexer 52. The output of multiplexer 52 is controlled by a signal from timing and control circuit 28. Multiplexer 52 is coupled to multiplier 54. Multiplier 54 amplifies the output of multiplexer 52 according to a control signal, GAIN ADJ, from timing and control circuit 28. Multiplier 54 is coupled to adder 56. Adder 56 is coupled to A/D converter 58. Adder 56 is also controlled by a signal from timing and control circuit 28. Additionally, an output of A/D converter 58 is coupled to adder 56.

In operation, a video signal is provided to analog to digital converter circuit 18'. The video signal may be filtered in first low pass filter 48 or second low pass filter 50 to prevent aliasing in A/D converter 58. For example, first low pass filter 48 may comprise a low pass filter having a roll-off point at 30 MHz or other appropriate frequency for filtering a Y video signal. Additionally, second low pass filter 58 may comprise a low pass filter having a roll-off point at 15 MHz or other appropriate frequency for filtering a color difference signal. Alternatively, a video signal may be provided directly to multiplexer 52 without filtering via line 47.

Before the video signal is converted to a digital signal, the magnitude of the video signal may be adjusted in multiplier 54 to scale a voltage of, for example, 0.5 Volts peak-to-peak to the maximum analog input level of A/D converter 58. Additionally, a DC offset may be added in adder 56 to adjust the DC value of the component video signal to a predetermined level. Finally, the component video signal is sampled at an appropriate sampling rate, such as 71.1 MHz in A/D converter 58. The output of A/D converter 58 is provided to line slicer 14 of FIG. 1.

B. Line Slicer

Figure 6:
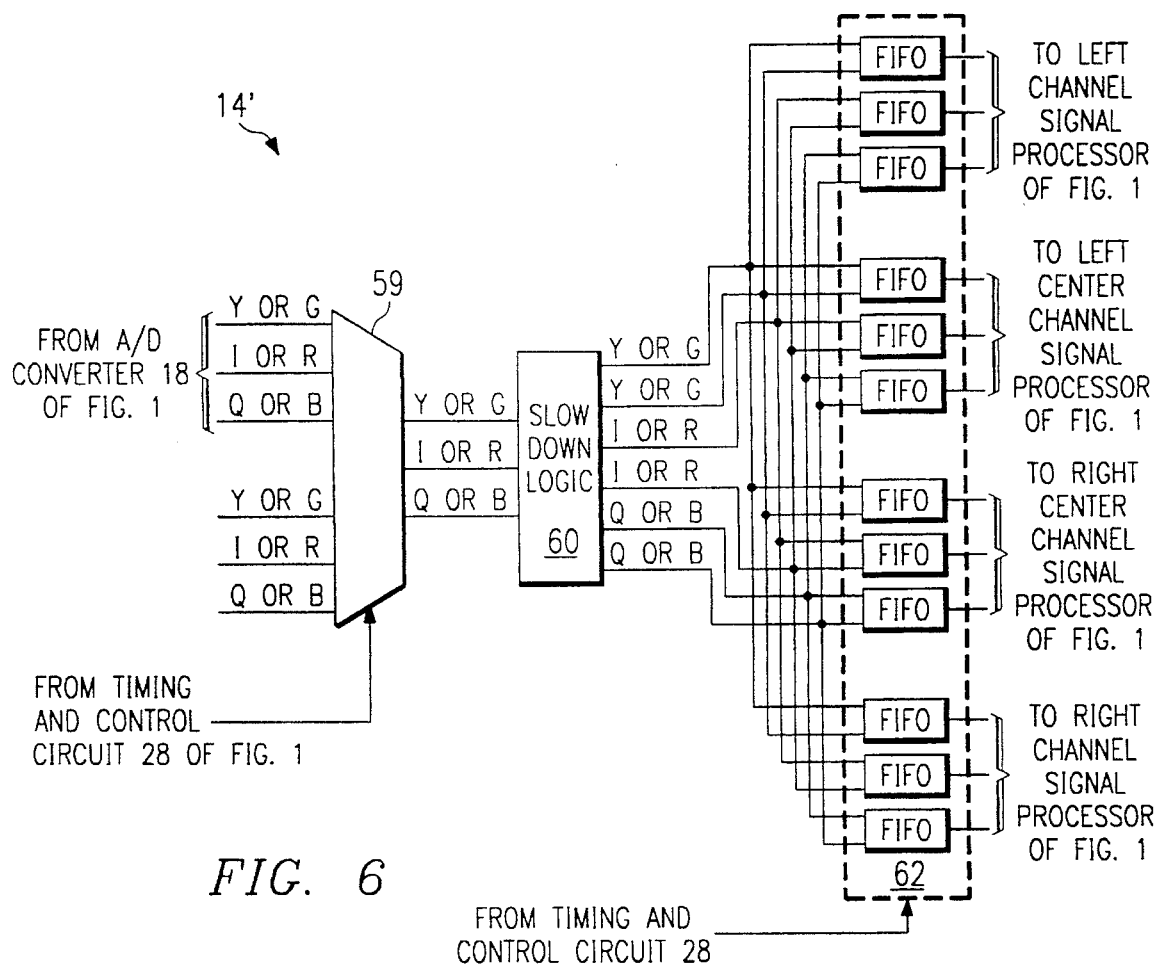
FIG. 6 illustrates an embodiment of the line slicer of FIG. 1 constructed according to the teaching of the present invention.

FIG. 6 illustrates an embodiment of a line slicer indicated generally at 14' and constructed according to the teachings of the present invention. The purpose of line slicer 14' is to divide each digital video signal into a plurality of separate channels for each line of composite video signal such that system 10 may process the separate channels in parallel. Line slicer 14' comprises multiplexer 59, slow down logic circuit 60, and a plurality of first in-first out buffer memories 62.

Multiplexer 59 receives input for line slicer 14'. Multiplexer 59 is coupled to analog to digital converter 18 of FIG. 1. Analog to digital converter 18 may provide digital video signals in a Y-I-Q color space or an R-G-B color space. Additionally, multiplexer 59 is coupled to receive digital video signals in either the Y-I-Q or R-G-B color space. For example, multiplexer 59 may be coupled to receive digital video signals in the SMPTE 260M format. Multiplexer 59 is coupled to slow down logic 60. The output of multiplexer 59 is controlled by a signal from timing and control circuit 28.

Slow down logic 60 compensates for a difference in speed between analog to digital converter 18 and first in-first out buffer memories 62 as described below. Multiplexer 59 provides three separate video signals to slow down logic circuit 60. For example, analog to digital converter circuit 18 may provide Y, I, and Q video signals to slow down logic circuit 60. Slow down logic circuit 60 may include two outputs for each video signal input. Both Y video outputs of slow down logic circuit 60 may be coupled to one first in-first out buffer memory 62 for each channel of processing circuitry 20. Additionally, each I video signal output of slow down logic circuit 60 may be coupled to a first in-first out buffer memory 62 for each channel of processing circuitry 20. Finally, each Q video signal output of slow down logic circuit 60 may be coupled to a first in-first out buffer memory 62 for each channel of channel signal processor 20.

In operation, line slicer 14' may divide each line of video data processed by analog to digital converter circuit 18 of FIG. 1 into separate channels. As shown for this embodiment, line slicer 14' divides each line of video data into four channels. As described previously, line slicer 14' may divide each line of video data into five channels or another appropriate number of channels.

Slow down logic circuit 60 may be used to compensate for a difference in operating speed between analog to digital converter circuit 18 and first in-first out buffer memories 62. For example, analog to digital converter circuit 18 of FIG. 1 may comprise ECL circuitry, whereas first in-first out buffer memory 62 may comprise TTL circuitry. Because ECL circuitry may operate at a higher speed than TTL circuitry, slow down logic circuit 60 may output data at, for example, one-half of the rate at which slow down logic circuit 60 receives data from analog to digital converter circuit 18 via multiplexer 59. For example, slow down logic circuit 60 may receive video signals wherein each pixel comprises a 10 bit word. Slow down logic circuit 60 may output the same video signal in 20 bit words by combining 10 bit words for successive pixels and outputting the combined words simultaneously.

Timing and control circuit 28 of FIG. 1 controls the location in which each pixel of video signal is stored within first in-first out buffer memories 62. The output of first in-first out buffer memory 62 is provided to processing circuitry 20 of FIG. 1.

C. Processing Circuitry.

FIG. 7 illustrates an embodiment of a channel signal processor indicated generally at 22' and constructed according to the teachings of the present invention. Processing circuitry 20 of FIG. 1 may comprise one channel signal processor 22' of FIG. 7 for each channel provided in system 10 of FIG. 1. However, the invention is not intended to be so limited.

Channel signal processor 22' comprises first and second matrix multiplication circuits 64 and 66, first and second look up tables 68 and 70 and a plurality of processing modules 72a through 72c. First matrix multiplication circuit 64 may be coupled to receive three digital video signals from line slicer 14 corresponding to one processing channel of system 10. First look up table 68 is coupled to three outputs of first matrix multiplication circuit 64. Each processing module 72a through 72c is coupled to one output of first look up table 68 to process one digital video signal. Each processing module 72a through 72c provides two outputs. Second matrix multiplication circuit 66 is coupled to each output of processing modules 72a through 72c. Second look up table 70 is coupled to each output of second matrix multiplication circuit 66. Second look up table 70 provides six outputs, e.g. two red outputs, two green outputs, and two blue outputs to formatter 24a through 24c of FIG. 1. Alternatively, the functions performed by channel signal processor 22' may be programmed into a single semiconductor device.

In operation, channel signal processor 22' transforms a standard, interlaced video signal provided by line slicer 14 of FIG. 1 into a refined, deinterlaced video signal capable of display on a display 26 in the following manner. First matrix multiplication circuit 64 may convert the digital video signals from one color space to another using the matrix multiplication described below. For example, an input in the NTSC format may be converted from Y, I, and Q video signals to R, G, and video signals. Alternatively, first matrix multiplication circuit 64 may be by-passed and this conversion function may be performed by second matrix multiplication circuit 66. Furthermore, first matrix multiplication circuit 64 may convert video signals in the R-G-B color space to any other appropriate color space. Finally, first matrix multiplication circuit 64 may be operable to perform color control functions, such as hue and saturation, by appropriate matrix multiplication. The hue and saturation functions are described in detail below.

First look-up table 68 may create linear video signals from the three outputs of first matrix multiplication circuit 64. In this manner, first look up table 68 may perform a "gamma correction" function by removing the effect of a gamma curve from a standard video signal. Alternatively, first look up table 68 may be by-passed and this function may be performed by second look up table 70. The gamma correction function is described in detail below.

Processing modules 72a through 72c perform the proscan function to "deinterlace" the input video signal thereby producing two lines of video output for each line of video input. Proscan may be performed in either the R-G-B color space or a color difference color space. Additionally, processing modules 72a through 72c may also perform a sharpness function on the digital video signals. The proscan and sharpness functions are set forth in detail below.

As described above, second matrix multiplication circuit 66 may convert the output of processing modules 72a through 72c from one color space to another using the matrix multiplication described below. Alternatively, second matrix multiplication circuit 66 may be by-passed if the output of processing modules 72a through 72c is in an appropriate color space for display on a display 26. For example, a display 26 may be operable to display digital video signals in the R-G-B color space. If the output of processing modules 72a through 72c are in the R-G-B color space, second matrix multiplication circuit 66 may be bypassed because the digital video signals are already in the appropriate color space.

As described above, second look up table 70 may perform the gamma correction function if not previously performed by first look up table 68. Additionally, second look up table 70 may perform a brightness function and a contrast function to affect the quality of the digital video signals. The brightness and contrast functions are described in detail below.

1. Color Space Conversion

As described above, channel signal processors 22a through 22d of FIG. 1 may convert the digital video signals from one color space to another in either first or second matrix multiplication circuits 64 or 66, or both. For example, first matrix multiplication circuit 64 may convert the digital video signals to the color space used by processing modules 72a through 72c. Processing modules 72a through 72c may be programmed to perform various signal processing functions on video signals in a particular color space as described in detail below. First matrix multiplication circuit 64 may be used to assure that the digital video signals provided to processing modules 72a through 72c are in the appropriate color space required by processing modules 72a through 72c.

Additionally, second color conversion circuit 66 may convert the output of processing modules 72a through 72c to the color space used by a display 26. It should be understood that it is within the scope of the teachings of the present invention to only incorporate either first or second matrix multiplication circuit 64 or 66.

First and second matrix multiplication circuits 64 and 66 may use various standard matrices to convert from one color space to another. In this manner, conversion from one color space to another comprises performing a simple matrix multiplication. A video signal in the NTSC format may be converted to the R-G-B color space by using equation (1):

$$\begin{bmatrix} R \\ G \\ B \end{bmatrix} = \begin{bmatrix} 1.0 & 0.96 & 0.62 \\ 1.0 & -0.28 & 0.65 \\ 1.0 & -1.1 & 1.7 \end{bmatrix} \begin{bmatrix} Y \\ I \\ Q \end{bmatrix} \quad (1)$$

A video signal in the PAL or SECAM format may be converted to the R-G-B color space by using equation (2):

$$\begin{bmatrix} R \\ G \\ B \end{bmatrix} = \begin{bmatrix} 1.0 & 1.140 & 0 \\ 1.0 & -0.581 & -0.395 \\ 1.0 & 0 & 2.032 \end{bmatrix} \begin{bmatrix} Y \\ V \\ U \end{bmatrix} \quad (2)$$

A video signal in the SMPTE 240M and SMPTE 260M format may be converted to the R-G-B color space by using equation (3):

$$\begin{bmatrix} G \\ B \\ R \end{bmatrix} = \begin{bmatrix} 1.0 & -0.277 & -0.477 \\ 1.0 & 1.826 & 0 \\ 1.0 & 0 & 1.576 \end{bmatrix} \begin{bmatrix} Y \\ Pb \\ Pr \end{bmatrix} \quad (3)$$

It is noted that R-G-B input signals can be converted to standard video formats using the information in equations (1) through (3). First, the matrix of the appropriate equation may be inverted using standard mathematical procedures. Next, the R-G-B signals may be multiplied by the inverted matrix. The output of this matrix multiplication is in the standard video format associated with the original matrix. For example, R-G-B signals may be converted to the SMPTE 240M standard according to equation (4):

$$\begin{bmatrix} Y \\ Pb \\ Pr \end{bmatrix} = \begin{bmatrix} 0.701 & 0.087 & 0.212 \\ -0.384 & 0.500 & -0.116 \\ -0.445 & -0.055 & 0.500 \end{bmatrix} \begin{bmatrix} G \\ B \\ R \end{bmatrix} \quad (4)$$

As noted above, first and second matrix multiplication circuits 64 and 66 may be bypassed. When bypassed first or second matrix multiplication circuit 64 or 66 may implement the identity matrix of equation (5) such that the output of first or second matrix multiplication circuit 64 or 66 is not changed by the color conversion matrix:

$$\begin{bmatrix} X1 \\ X2 \\ X3 \end{bmatrix} = \begin{bmatrix} 1 & 0 & 0 \\ 0 & 1 & 0 \\ 0 & 0 & 1 \end{bmatrix} \begin{bmatrix} X1 \\ X2 \\ X3 \end{bmatrix} \quad (5)$$

2. Gamma Correction

A standard television system may display a video signal on a Cathode Ray Tube (hereinafter "CRT"). Because a CRT is an analog device that does not provide a linear response to an input signal, a "gamma curve" is introduced into a standard video signal to compensate for the non-linearity of the CRT. For example, typical gamma curve 74 is shown in FIG. 8. However, system 10 of FIG. 1 may operate on a standard video signal but may display the video signal on a digital device, such as a DMD, that already has a linear response. Therefore, the quality of such a video signal displayed by displays 26a through 26c may be improved by removing the effect of the unneeded gamma curve. It should be noted that if displays 26a through 26c comprise analog displays, the degamma function may be unnecessary.

Specifically, first and second look up tables 68 and 70 of FIG. 7 may provide gamma correction curve 76 of FIG. 8. As shown in FIG. 8, the combination of gamma curve 74 of a standard video signal with gamma correction curve 76 of first or second look up table 68 or 70 respectively results in resultant video signal 78 having linear characteristics.

First and second look up tables 68 and 70 of FIG. 7 may each comprise, for example, two tables. The first table may comprise appropriate gamma correction factors corresponding to various input levels. The second table may comprise a unity multiplication factor. The second table may be used when first or second look up tables 68 or 70 is bypassed. It is within the scope of the teachings of the present invention to provide for only one look up table 68 or 70.

The values of the first table corresponding to various standard video signals may be calculated according to equations (6) through (10) below. For NTSC video signals, the values of the first look up table may be calculated using equations (6) and (7):

$$Z=[(Yv+0.099)/1.099]^{(\gamma)} \text{ for } Yv \geq 0.0812 \quad (6)$$

$$Z=Yv/4.5 \text{ for } Yv<0.0812 \quad (7)$$

In equations (6) and (7), Yv is the voltage level of the input value normalized to the system reference white, $\gamma$ is the gamma factor, and Z is the gamma corrected value. For PAL and SECAM video signals, the values of the first look up table may be calculated using equation (8):

$$Z=y^\gamma \quad (8)$$

In equation (8), y is the input value, $\gamma$ is the gamma factor and Z is the gamma corrected value. For SMPTE 240M and 260M video signals, the values of the first look up table may be calculated using equations (9) and (10):

$$Z=[(Yv+0.1115)/1.1115]^{(\gamma)} \text{ for } Yv>0.0913 \quad (9)$$

$$Z=Yv/4.0 \text{ for } Yv<0.0913 \quad (10)$$

In equations (9) and (10), Yv is the voltage level of the input value normalized to the system reference white, $\gamma$ is the gamma factor, and Z is the gamma corrected value.

3. Progressive Scan

A standard television signal divides a frame of video into two separate fields. The two fields may be successively transmitted and displayed on a television screen. The first field may contain, for example, the odd lines of a single frame and the second field may contain, for example, the even lines of the same frame. The two fields appear to an observer as a single frame. This is known as "interlaced" transmission and display of a video signal.

The progressive scan function performed by each channel signal processor 22a through 22c of FIG. 1 may create a full video frame from each field provided by a standard video source. Therefore, the progressive scan or proscan function may be referred to as a "deinterlacing" function.

a. Two modes

The proscan function may be performed in processing modules 72a through 72c of FIG. 7. Two modes of performing the proscan function are described. The two modes are referred to hereinafter as "Mode A" and "Mode B" respectively. Table 3 below lists the various functions implemented by each of Mode A and Mode B to perform the proscan function.

TABLE 3

| Mode A | Mode B |
|---|---|
| Motion Detection | Motion Detection |
| Temporal Motion | Spatial Filtering |
| Spatial Filtering | Interpolation |
| Interpolation | Vertical Scaling |

As described previously, the proscan function can be performed in either the R-G-B color space or a color difference color space such as Y-Pr-Pb. In the R-G-B color space, all of the functions listed in Table 3 may be performed on each of the R, G, and B video signals. In a color difference color space, all of the functions listed in Table 3 may be performed on the Y video signal. Additionally, the interpolation and vertical scaling functions may also be performed on the remaining video signals in a color difference color space.

Figure 10:
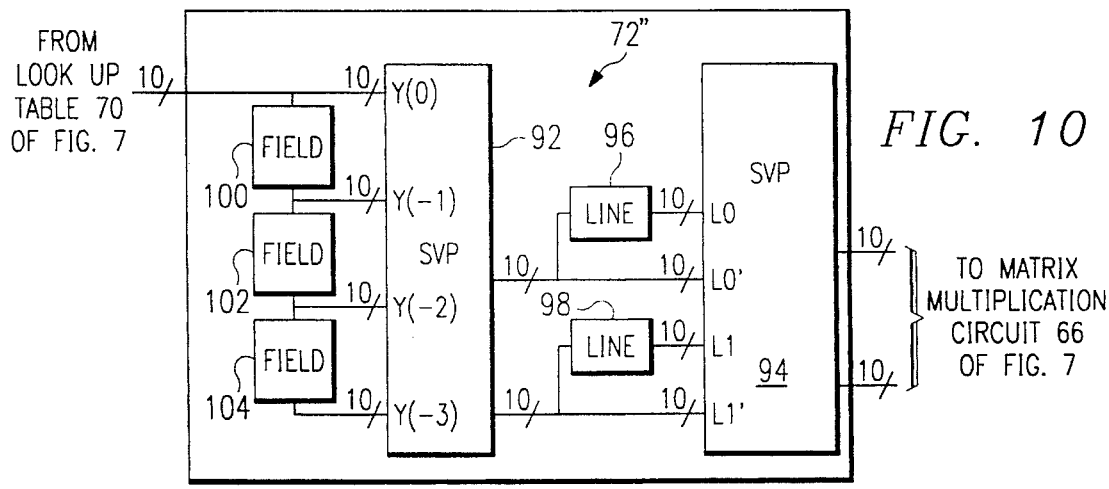
FIG. 10 illustrates another embodiment of a processing module of FIG. 7 constructed according to the teachings of the present invention.

FIGS. 9 and 10 illustrate two embodiments of processing modules indicated generally at 72' and 72" respectively, and constructed according to the teachings of the present invention for implementing Modes A and B respectively. The operations performed in each processing module 72' and 72" shown in FIGS. 9 and 10 respectively are described below. Processing modules 72a through 72c of FIG. 7 may comprise, for example, either processing module 72' of FIG. 9 or processing module 72" of FIG. 10.

FIG. 9 illustrates a processing module indicated generally at 72' and constructed according to the teachings of the present invention. Processing module 72' may comprise first and second video processors 80 and 82, line delay 84, and first, second, and third field delays 86, 88, and 90. First and second video processors 80 and 82 may comprise, for example, scanline video processors produced by TEXAS INSTRUMENTS INCORPORATED. A digital video signal is coupled to a current field input, labeled Y(0), of first video processor 80 and first field delay 86. First field delay 86 is coupled to second field delay 88. Second field delay 88 is coupled to a second previous field input, labeled Y(-2), of first video processor 80. In this manner, the appropriate information is provided to first video processor 80 to perform the motion detection function.

First video processor 80 is coupled to an input, labeled Y0, L0, of second video processor 82. Additionally, the output of first video processor 80 is also coupled to line delay 84. Line delay 84 is coupled to an input labeled Y0, L1 of second video processor 82. Second video processor 82 provides two output lines.

In operation, first video processor 80 uses data from a current field and a second previous field to perform motion detection for Mode A. The second previous field is provided to first video processor 80 by first and second field delays 86 and 88. The details of the motion detection function are set forth below. The proscan function is completed by processing module 72' of FIG. 9 by performing the spatial filtering, interpolation and vertical scaling functions in second video processor 82. The details of the spatial filtering, interpolation and vertical scaling functions are set forth below.

FIG. 10 illustrates a processing module indicated generally at 72" and constructed according to the teachings of the present invention. Processing module 72" may comprise first and second video processors 92 and 94, first and second line delays 96 and 98 and first, second, and third field delays 100, 102 and 104. First and second video processors 92 and 94 may comprise, for example, scanline video processors produced by TEXAS INSTRUMENTS INCORPORATED. A digital video signal is coupled to a current field input, labeled Y(0), of first video processor 92 and first field delay 100. First field delay 100 is coupled to a previous field input, labeled Y(-1), of first video processor 92 and second field delay 102. Second field delay 102 is coupled to a second previous field input, labeled Y(-2), of first video processor 92 and third field delay 104. Third field delay 104 is coupled to a third previous field, labeled Y(-3), input of first video processor 92. In this manner, the appropriate information is provided to first video processor 92 to perform the motion detection, spatial filtering, and interpolation functions.

First video processor 92 provides two lines of output for each line in a video field. The two lines output by first video processor 92 are coupled to two inputs, namely L0' and L1', of second video processor 94. Additionally, the two lines output by first video processor 92 are coupled to first and second line delays 96 and 98 respectively. First and second line delays 96 and 98 are coupled to inputs L0 and L1 of second video processor 94. Second video processor 94 provides two output lines.

In operation, first video processor 92 uses data from a current field and three previous fields to perform motion detection, spatial filtering, and interpolation as called for by Mode B. These fields are provided to first video processor 92 by first, second and third field delays 100, 102, and 104. The details of these functions are set forth below. The proscan function is completed by processing module 72" of FIG. 10 by performing the vertical scaling function in second video processor 94. The details of the vertical scaling function are also set forth below.

b. Motion detection

Motion detection may be performed in both Mode A and Mode B. However, each mode may perform this motion detection in a different manner. The output of the motion detection function may be used to determine a factor, referred to as a "k" factor, for each pixel in a video field. The ultimate k factor for each pixel may be used in the interpolation function detailed below to convert a video field into a video frame by filling in the missing lines.

In Mode A, the output of this motion detection function is further refined to provide the k factor by the temporal motion and spatial filtering functions detailed below. In mode B, the output of this motion detection function is modified to provide the k factor by the spatial filtering function.

Figure 11A:
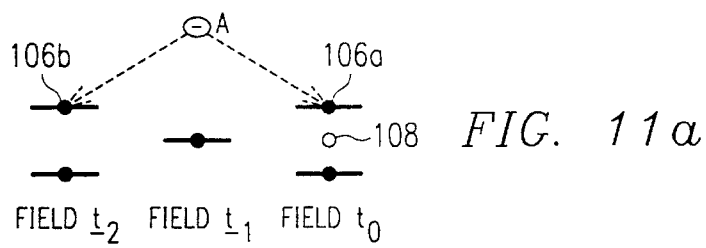
FIG. 11a illustrates the relationship between the pixels used by a motion detection function according to the teachings of the present invention.

FIG. 11a illustrates the relationship between the pixels used by the motion detection function according to Mode A. In Mode A, the motion detection function takes the difference between the value of a neighboring pixel 106a in a current field and a value of the same pixel 106b in a second previous field to detect motion for a pixel 108. The output of the motion detection function may be referred to as MD. As described previously, the motion detection function may be performed in processing module 72" of FIG. 9.

Figure 11B:
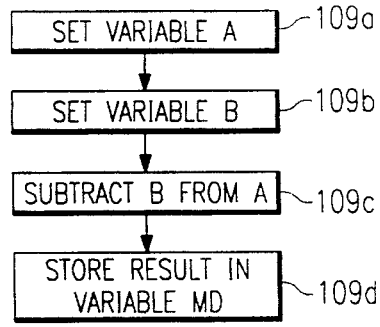
FIG. 11b is a flow chart for performing a motion detection function according to the teachings of the present invention.

FIG. 11b is a flow chart for performing the motion detection function according to mode A. In processing Module 72" a variable A is set to the value of a pixel 106a of FIG. 11a for a current video field. The method of FIG. 11b proceeds to block 109b wherein a variable b is set to the value of pixel 106b of FIG. 11a. The value of pixel 106b is provided to first video processor 80 by first and second field delays 86 and 88 and corresponds to the second previous field of pixel 106a. In first video processor 80, the value of variable B is subtracted from the value of variable A at Block 109c. Finally, the result of the subtraction step is stored in a variable MD inverse video processor 80 at block 109d.

Figure 12A:
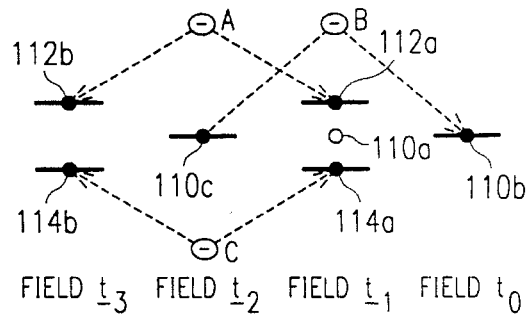
FIG. 12a illustrates the relationship between the pixels used by a motion detection function according to the teachings of the present invention.

FIG. 12a illustrates the pixels used by the motion detection function according to mode B. In mode B, the output of the motion detection function for pixel 110a is a weighted average of three differences. The motion detection output, MD, may be calculated according to equation (11):

$$MD = ((\tfrac{1}{4} * |A_{f1} - A_{f3}|) + (\tfrac{1}{2} * |C_{f1} - C_{f3}|) + (\tfrac{1}{4} * |B_{f0} - B_{f2}|)) \quad (11)$$

In equation (11), the term $|A_{f1} - A_{f3}|$ is the difference between the value of a first neighboring pixel 112a in a first previous field and the same pixel 112b in a third previous field. Additionally, the term $|C_{f1} - C_{f3}|$ is the difference between a value of a second neighboring pixel 114a in a first previous field and the same pixel 114b in a third previous field. Finally, the term $|B_{f0} - B_{f2}|$ is the difference between the value of pixel 110b in the current field and the value of the same pixel 110c in a second previous field.

Figure 12B:
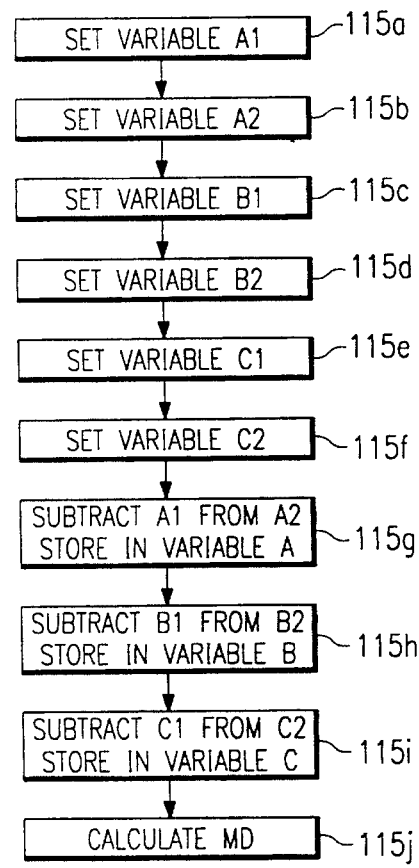
FIG. 12b is a flow chart for performing a motion detection function according to the teachings of the present invention.

FIG. 12b is a flow chart for performing the motion detection function of Mode B. As described previously, the motion detection function of Mode B may be performed in processing module 72". In first video processor 92, the value of a variable A1 is set to the value of pixel 112a of FIG. 12a at block 115a. The value of pixel 112a is provided to first video processor 92 by first field delay 100. The method proceeds to block 115b wherein a variable A2 is set to the value of pixel 112b of FIG. 12a. The value of pixel 112b is provided to first video processor 92 by first, second, and third field delays 100, 102 and 104. At block 115c, a variable B1 of first video processor 92 is set to the value of pixel 114a of FIG. 112a. The value of pixel 114a is provided to first video processor 92 by first field delay 100. The method proceeds to block 115d wherein a variable B2 is set to the value of pixel 114b. The value of pixel of 114b is provided to first video processor 92 by first, second, and third field delays 100, 102, and 104. At block 115e, a variable C1 of first video processor 92 is set to the value of pixel 110b of FIG. 12a. At block 115f, a variable C2 is set to the value of pixel 110c of the FIG. 112a. The value of pixel 110c is provided to first video processor 92 by first and second field delays 100 and 102. At block 115g, the value of variable A1 is subtracted from the value of variable A2 in first video processor 92. The result at the subtraction operation is stored in a variable A. At block 115h, the value of variable of B1 is subtracted from the variable of B2. The result of the subtraction operation is stored in variable. B of first video processor 92. At block 115i, the value of variable C1 is subtracted from the value of variable C2. The result of the subtraction operation is stored in variable C of first video processor 92. Finally, at block 115j, a value for the motion detection function, MD, is calculated in first video processor 92 according to equation (11).

c. Temporal motion

Figure 13A:
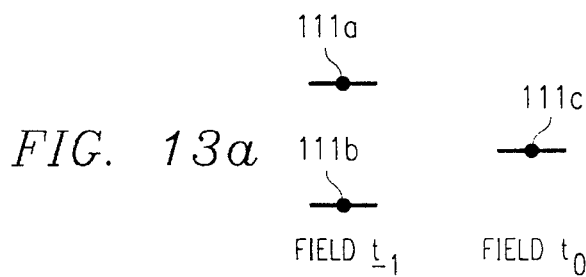
FIG. 13a illustrates the relationship between the pixels used to perform the temporal motion detection function according to the teachings of the present invention.
Figure 13B:
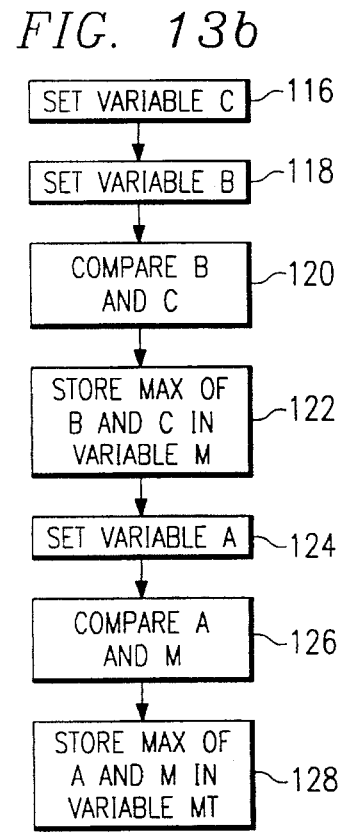
FIG. 13b is a flow chart for performing temporal motion detection according to the teachings of the present invention.

Temporal motion detection may be used in Mode A to further refine the output of the motion detection function for each pixel by checking for motion occurring around the pixel of interest as shown in FIGS. 13a and 13b. FIG. 13a illustrates the pixels used by the temporal motion detection function. FIG. 13b is a flow chart for performing temporal motion detection according to the teachings of the present invention to determine an output MT. The method of FIG. 13b begins at block 116 by setting the value of a variable C in second processing module 82 of FIG. 9 to the output of the motion detection function of FIGS. 11a and 11b for a pixel 111C of the current field. The method proceeds to block 118 wherein the value of a variable B is set to the motion detection value for pixel 111b of FIG. 13a of a first previous field. The value of pixel 111b is provided to second video processor by third field delay 90. At block 120, the value of variable B and the value of variable C are compared in second video processor 82. The maximum of the value of variable B and the value of variable C is stored in variable M of second video processor 82 at block 122. At block 124, a variable A is set to the motion detection value for pixel 111a of FIG. 13a in the first previous field. The value of pixel 111a is provided to second video processor by line delay 84. At block 126, the value of variable A is compared with the value of variable M in second video processor 82. Finally, the maximum of variable A and variable M is stored in variable MT in second video processor 82. Therefore, the variable of MT represents the output of the temporal motion function.

d. Spatial filtering

In both Mode A and Mode B, the output of the motion detection functions, MD or MT, may be filtered before being used in the interpolation function. Consequently, the output of the motion detection functions may be filtered in both the horizontal and vertical planes to reduce the effects of noise in system 10 of FIG. 1.

Figure 14:
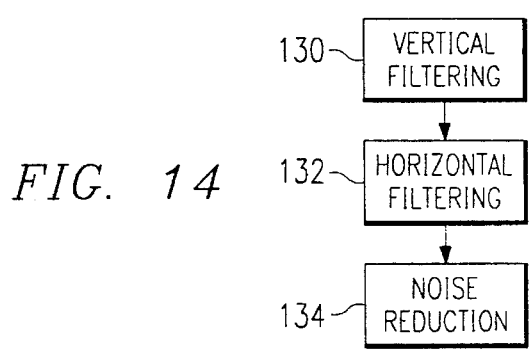
FIG. 14 is a flow chart for performing spatial filtering according to the teachings of the present invention.

FIG. 14 is a flow chart for performing spatial filtering of MD or MT to produce the k factor according to the teachings of the present invention. The spatial filtering function may be performed on MT in second video processor 82 of FIG. 9. Alternatively, the spatial filtering function may be performed on MD by first video processor 92 of FIG. 10. The method begins at block 130 wherein MD or MT is filtered in the vertical plane. For example, MD or MT may be provided to a vertical low pass filter. The vertical low pass filter may, for example, implement a 5 tap vertical low pass filter. Vertical low pass filter may operate on MD, for example, according to equation (12):

$$MD_1 = (¼H^{-2} + ½H^{-1} + ½ + ½H + +e, \text{fra } 1/4 + ee \, H^2) * MD \quad (12)$$

What equation (12) represents is that the output of the vertical low pass filter may be a weighted average of the pixel in question, the two pixels above it in the same field, and the two pixels below it in the same field. At block 132, the output of vertical filtering step is filtered in the horizontal plane. For example, the output of the vertical low pass filtering may be provided to a horizontal low pass filter. The horizontal low pass filter may comprise, for example, a 9 tap horizontal low pass filter. The horizontal low pass filter may operate on MD, for example, according to equation (13):

$$MD_2 = \tfrac{1}{8}(T^{-1}+T)(T^{-2}+T^2)(T^{-1}+1)(1+T) * MD_1 \quad (13)$$

Similar to equation (12), what equation (13) represents is that the output of the horizontal low pass filter will be a weighted average of the pixel of interest, the four pixels to the right in the same line, and the four pixels lo to the left in the same line. Finally, at block 134, the output of the horizontal filtering may be modified to reduce the effect of noise. Furthermore, a constant may be subtracted from the output of horizontal filtering step and the result may be truncated to four bits to further reduce the effect of noise. The output of the noise reduction step is the k factor for use in the interpolation function described below.

e. Interpolation

A single field of video signal is converted into an entire frame of data using the interpolation function. Three interpolation functions may be used in both Mode A and Mode B. The three interpolation functions are referred to as motion adaptive line doubling and line averaging. The specific interpolation function used may be based on the video signal being processed as shown in Table 4 below. The interpolation functions may be implemented in second video processor 82 of FIG. 9 or first video processor 92 of FIG. 10.

TABLE 4

| Video Signal | Interpolation Method |
| --- | --- |
| R, G and B | Motion adaptive |
| Y | Motion adaptive |
| Pr, Pb or I, Q or U, | Line Averaging or |
| V | Line Doubling |

Figure 15A:
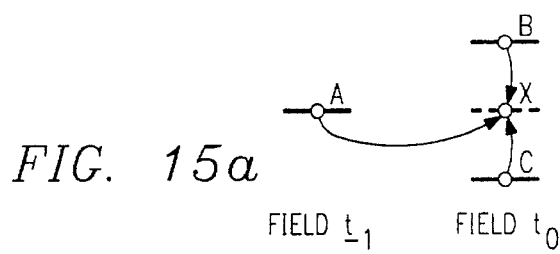
FIG. 15a illustrates a motion adaptive interpolation function according to the teachings of the present invention.
Figure 15B:
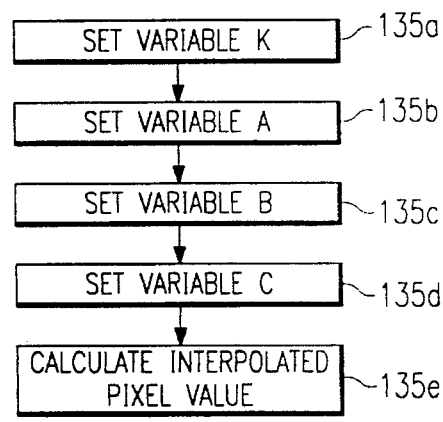
FIG. 15b is a flow chart for performing a motion adaptive interpolation function according to the teachings of the present invention.

FIGS. 15a and 15b illustrate the motion adaptive interpolation function according to the teachings of the present invention. FIG. 15a illustrates the pixels used to perform the motion adaptive function. FIG. 15b is a flow chart of a method for performing the motion adaptive function. The motion adaptive function determines a value for pixel X based on pixels B and C in adjacent lines of the current field and pixel A in the same position as pixel X, but in the previous field as shown in FIG. 15a. The value of pixel X is determined according to equation (14):

$$X - k(B+C)/2 + (1-k)A \quad (14)$$

In equation (14), k is the k factor output from the spatial filtering function. Equation (14) may be implemented according to the flow chart of FIG. 15b.

The method of FIG. 15b begins at block 135a wherein a variable K is set to the k factor output of the spatial filtering function for a particular pixel at block 135a. The method proceeds to block 135b wherein a variable A is set to the value of pixel A of FIG. 15a. At block 135c, a variable B is set to the value of pixel B of FIG. 15a. At block 135d, the value of a variable C is set to the value of pixel C of FIG. 15a. Finally, an interpolated pixel value is calculated according to equation (14). The method of FIG. 15b may be performed in second video processor 82 of FIG. 9 or first video processor 92 of FIG. 10.

Figure 16:
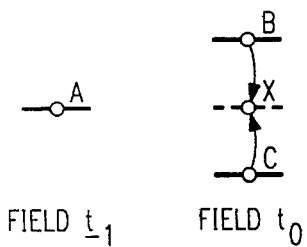
FIG. 16 illustrates a line averaging interpolation function according to the teachings of the present invention.

FIG. 16 illustrates the line averaging interpolation function according to the teachings of the present invention. The line averaging interpolation function determines a value for pixel X based on pixels B and C in adjacent lines of the current field. The value of pixel X is determined according to equation (15):

$$X=(B+C)/2 \quad (15)$$

Figure 17:
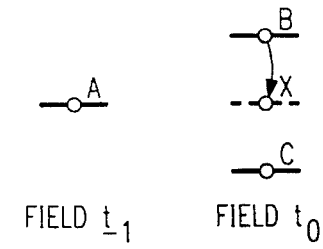
FIG. 17 illustrates a line doubling function according to the teachings of the present invention.

Finally, FIG. 17 illustrates the line doubling function according to the teachings of the present invention. The line doubling function equates the value of pixel X with the value of pixel B according to equation (16):

$$X=B \quad (16)$$

f. Vertical scaling

The vertical dimension of a video frame may be expanded or contracted by the vertical scaling function. Two methods of vertical scaling are provided for use in Mode B. The two methods are referred to as bilinear and cubic interpolation. The vertical scaling function may be used to expand a video frame to use a larger portion of displays 26a through 26c of FIG. 1.

Figure 18:
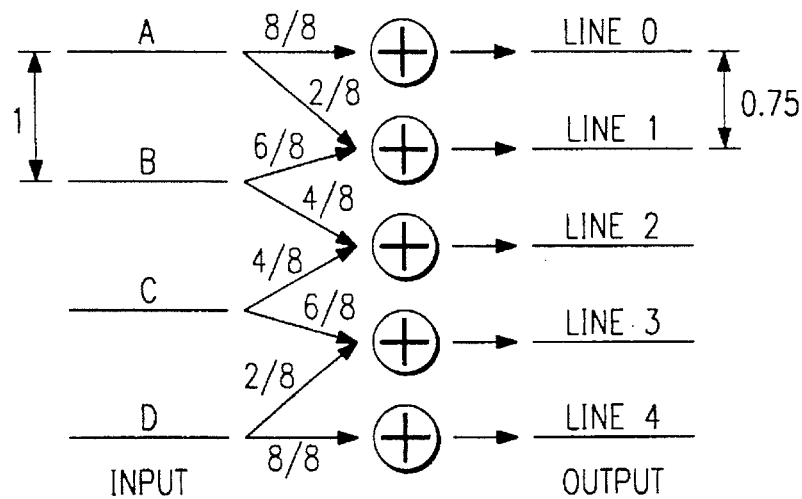
FIG. 18 illustrates bilinear interpolation for scaling three lines of input video signal into four lines of output video signal according to the teachings of the present invention.

FIG. 18 illustrates bilinear interpolation for scaling three lines of input video signal into four lines of output video signal according to the teachings of the present invention. The three input lines are designated as line A through line C. The four output lines are designated as line 0 through line 3. Line A through line C may be scaled to produce line 0 through line 3 with a small contribution from line D according to equations (17a) through (17d):

$$\text{Line } 0 = A \quad (17a)$$

$$\text{Line } 1 = \tfrac{2}{8}A + \tfrac{6}{8}B \quad (17b)$$

$$\text{Line } 2 = \tfrac{4}{8}B + \tfrac{4}{8}C \quad (17c)$$

$$\text{Line } 3 = \tfrac{6}{8}C + \tfrac{2}{8}D \quad (17d)$$

Beginning with line D, the next three lines of input video signal may also be scaled to four output video lines according to equations (17a) through (17a). The bilinear scaling function of equations (17a) through (17d) may be repeatedly applied to the remaining input lines to produce corresponding sets of output lines.

Similarly, nine lines of input video signal may be converted to ten lines of video output according to equations (18a) through (18j) below:

$$\text{Line } 0 = A \quad (18a)$$

$$\text{Line } 1 = 0.1A + 0.9B \quad (18b)$$

$$\text{Line } 2 = 0.2B + 0.8C \quad (18c)$$

$$\text{Line } 3 = 0.3C + 0.7D \quad (18d)$$

$$\text{Line } 4 = 0.4D + 0.6E \quad (18e)$$

$$\text{Line } 5 = 0.5E + 0.5F \quad (18f)$$

$$\text{Line } 6 = 0.6F + 0.4G \quad (18g)$$

$$\text{Line } 7 = 0.7g + 0.3H \quad (18h)$$

$$\text{Line } 8 = 0.8H + 0.2I \quad (18i)$$

$$\text{Line } 9 = 0.9I + 0.1J \quad (18j)$$

The input video lines are referred to as line A through line J. The output video lines are referred to as line 0 through line 9. Beginning with line J, the next nine lines of input video signal may also be scaled to ten output video lines according to equations (18a) through (18j). The bilinear scaling function of equations (18a) through (18j) may be repeatedly applied to the remaining input lines to produce corresponding sets of output lines.

Figure 19:
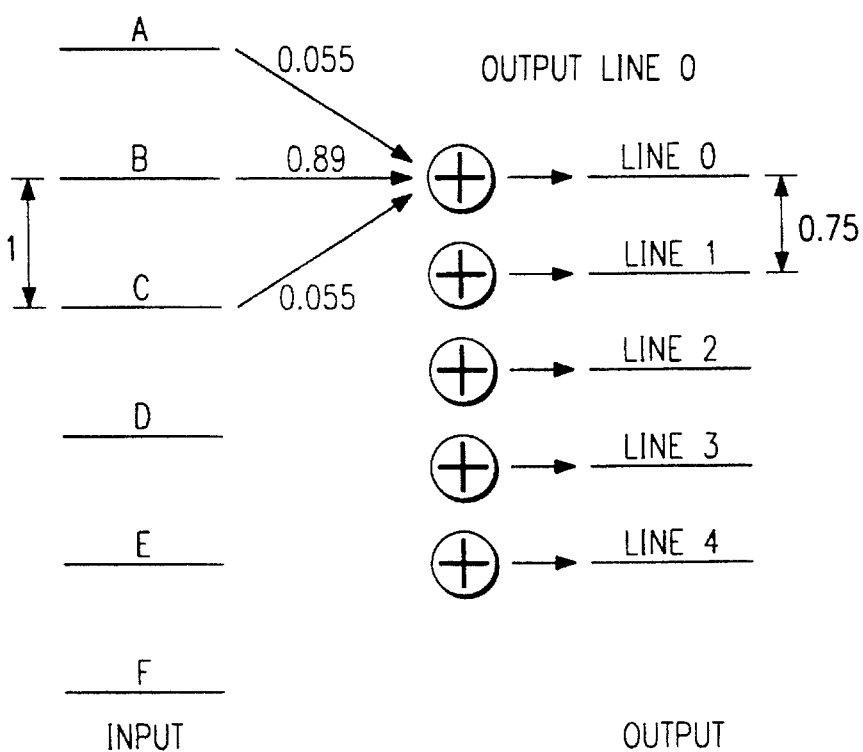
FIGS. 19 and 20 illustrate cubic interpolation for scaling three lines of input video signal to four lines of output video according to the teachings of the present invention.
Figure 20:
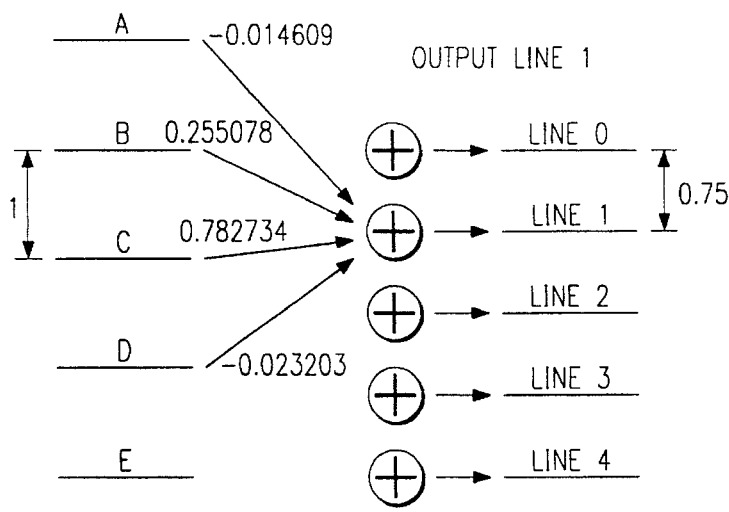

As an alternative to the bilinear interpolation described above, FIGS. 19 and 20 illustrate cubic interpolation for scaling three lines of input video signal into four lines of output video signal according to the teachings of the present invention. The three input lines are designated as line B through line D. The four output lines are designated as line 0 through line 3. Line B through line D may be scaled to produce line 0 through line 3 with small contributions from line A, line E, and line F according to equations (19a) through (19d):

$$\text{Line } 0 = 0.055A + 0.89B + 0.055C \quad (19a)$$

$$\text{Line } 1 = -0.014609A + 0.255078B + 0.782734C - 0.023203D \quad (19b)$$

$$\text{Line } 2 = -0.034375B + 0.534375C + 0.534375D - 0.034375E \quad (19c)$$

$$\text{Line } 3 = -0.023203C + 0.782734D + 0.255078E - 0.014609F \quad (19d)$$

Beginning with line D, the next three lines of input video signal may also be scaled to four output video lines according to equations (19a) through (19d). The cubic scaling function of equations (19a) through (19d) may be repeatedly applied to the remaining input lines to produce corresponding sets of output lines.

Similarly, cubic interpolation may also be used to scale nine lines of input video signal may to ten lines of video output according to equations (20a) through (20j) below:

$$\text{Line } 0 = 0.055A + 0.89B + 0.055C \quad (20a)$$

$$\text{Line } 1 = -0.002915A + 0.118475B + 0.871075C - 0.013365D \quad (20b)$$

$$\text{Line } 2 = -0.01012B + 0.205200C + 0.819D - 0.01408E \quad (20c)$$

$$\text{Line } 3 = -0.019305C + 0.308125D + 0.740825E - 0.029645F \quad (20d)$$

$$\text{Line } 4 = -0.02816D + 0.4202E + 0.6436F - 0.03564G \quad (20e)$$

$$\text{Line } 5 = -0.034375E + 0.534375F + 0.534375G - 0.034375H \quad (20f)$$

$$\text{Line } 6 = -0.03564F + 0.6435G + 0.4202H - 0.02816I \quad (20g)$$

$$\text{Line } 7 = -0.029645G + 0.740825H + 0.3081251 - 0.019305J \quad (20h)$$

$$\text{Line } 8 = -0.014080H + 0.81900I + 0.2052J - 0.010120K \quad (20i)$$

$$\text{Line } 9 = -0.013365I + 0.871075J + 0.118475K - 0.002915L \quad (20j)$$

The input video lines are referred to as line B through line J. The output video lines are referred to as line 0 through line 9. Beginning with line J, the next nine lines of input video signal may also be scaled to ten output video lines according to equations (20a) through (20j). The cubic scaling function of equations (20a) through (20j) may be repeatedly applied to the remaining input lines to produce corresponding sets of output lines.

4. Picture Controls

System 10 of FIG. 1 allows for various qualities of a video picture displayed on displays 26a through 26c to be controlled by user input. Specifically, a user of system 10 may control such picture qualities as sharpness, contrast, brightness, hue and saturation. Saturation and hue may, for example, be controlled in first or second matrix multiplication circuit 64 or 66 of FIG. 7. Brightness and contrast may, for example, be controlled in second look up table 70 of FIG. 7. Finally, saturation may, for example, be controlled in processing modules 72a through 72c of FIG. 7.

FIGS. 21a through 21d are flow charts illustrating different methods for performing the various picture quality control functions according to the teachings of the present invention. The various methods differ in the order and color space in which the picture quality control functions are performed. FIGS. 21a through 21d will be described with respect to channel signal processor 22' of FIG. 7.

Figure 21A:
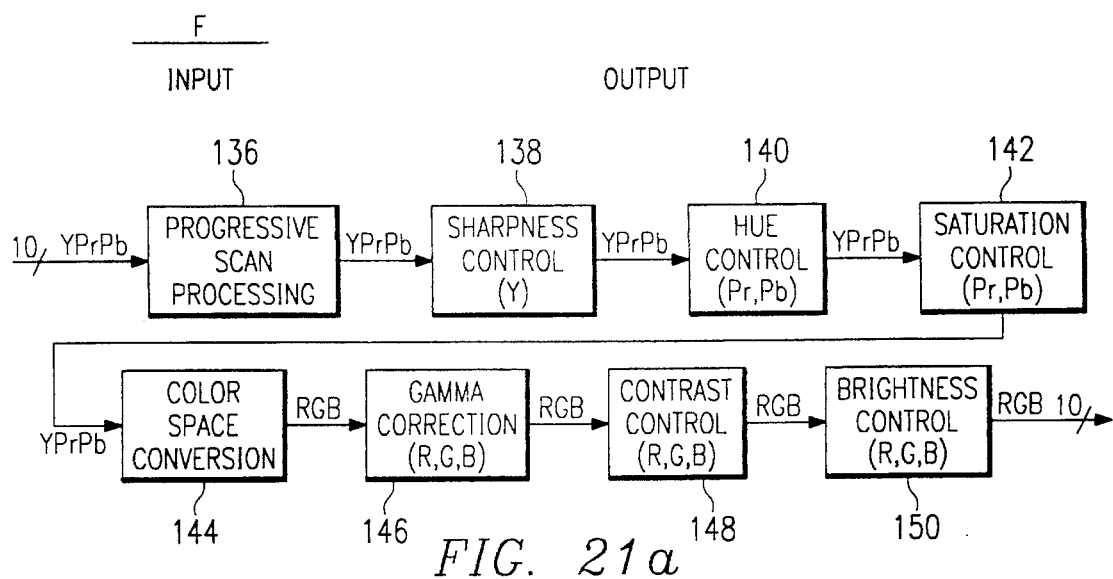
FIG. 21a through 21d are flow charts illustrating various methods for performing picture quality functions according to the teachings of the present invention.

The method of FIG. 21a begins by performing the progressive scan function at block 136 in a color difference color space in processing modules 72a through 72c. The sharpness function is performed on the Y video signal by, for example, processing module 72a at block 138. At block 140, the hue control function is performed on the Pr and Pb video signals by second matrix multiplication circuit 66. At block 142, the saturation control function is performed on the Pr and Pb video signals by second matrix multiplication circuit 66. The video signal is converted from the color difference color space to the R-G-B color space by second matrix multiplication circuit 66 at block 144. In the R-G-B color space, the gamma correction function is performed on the R, G, and B video signals in second look up table 70 at block 146. At block 148, the contrast function is performed on the R, G, and B video signals in second look up table 70. Finally, the brightness function is performed on the R, G, and B video signals in second look up table 70 at block 150.

Figure 21B:
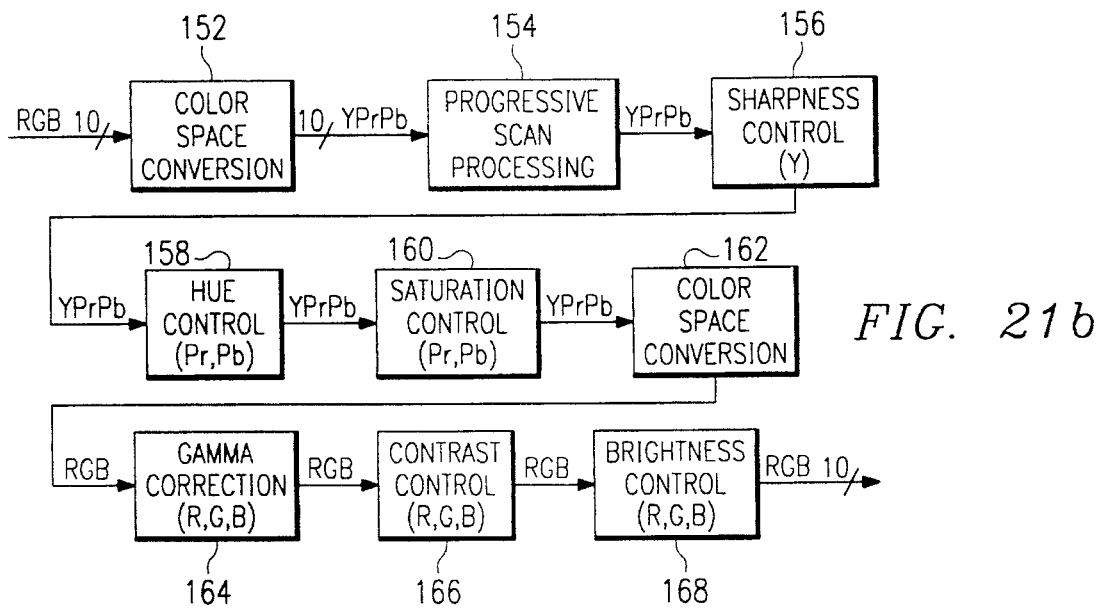

The method of FIG. 21b begins by performing a color space conversion at block 152 in first matrix multiplication circuit 64. The method proceeds to block 154 wherein the progressive scan function is performed in the color difference color space in processing modules 72a through 72c. The sharpness function is performed on the Y video signal by, for example, processing module 72a at block 156. At block 158, the hue control function is performed on the Pr and Pb video signals by second matrix multiplication circuit 66. At block 160, the saturation control function is performed on the Pr and Pb video signals by second matrix multiplication circuit 66. The video signal is converted from the color difference color space to the R-G-B color space by second matrix multiplication circuit 66 at block 162. In the R-G-B color space, the gamma correction function is performed on the R, G, and B video signals in second look up table 70 at block 164. At block 166, the contrast function is performed on the R, G, and B video signals in second look up table 70. Finally, the brightness function is performed on the R, G, and B video signals in second look up table 70 at block 168.

Figure 21C:
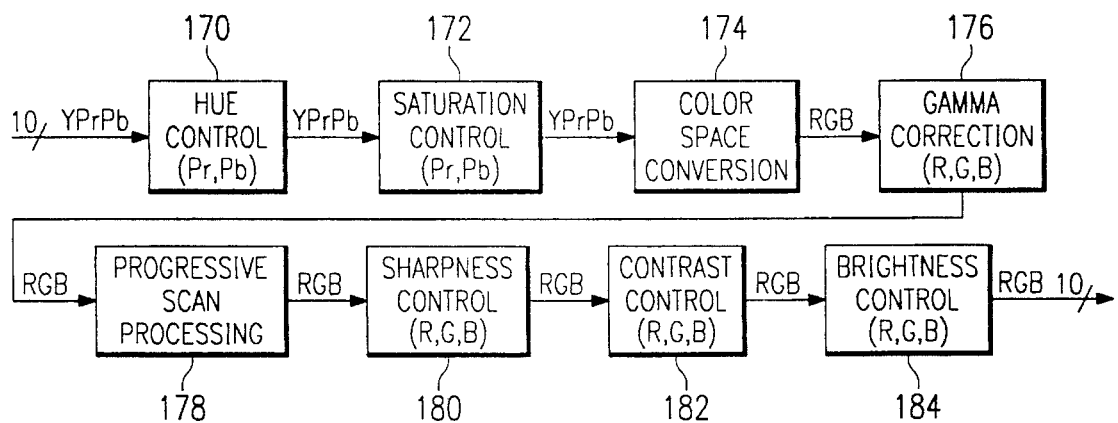

The method of FIG. 21c begins by performing the hue control function on the Pr and Pb video signals in first matrix multiplication circuit 64 at block 170. At block 172, the saturation control function is performed on the Pr and Pb video signals by first matrix multiplication circuit 64. The video signal is converted from the color difference color space to the R-G-B color space for processing in processing modules 72a through 72c by first matrix multiplication circuit 64 at block 174. The gamma correction function is performed on the R, G, and B video signals in first look up table 68 at block 176. In the R-G-B color space, the progressive scan function is performed by processing modules 72a through 72c at block 178. The sharpness function is performed on the R, G and B of the video signal by processing module 72 at block 180. At block 182, the contrast function is performed on the R, G, and B video signals in second look up table 70. Finally, the brightness function is performed on the R, G, and B video signals in second look up table 70 of block 184.

Figure 21D:
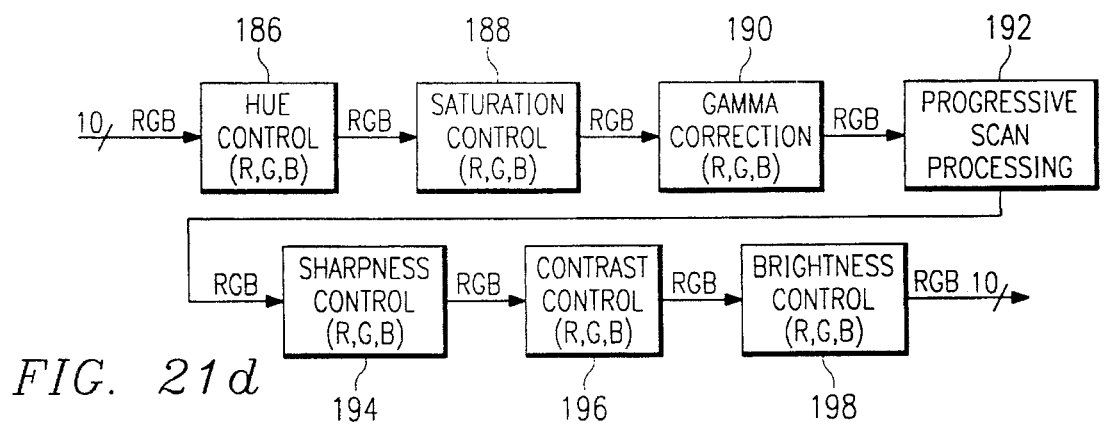

The method of FIG. 21d begins by performing the hue control function on the R, G, and B video signals in first matrix multiplication circuit 60 at block 186. At block 188, the saturation control function is performed on the R, G, and B video signals by first matrix multiplication circuit 64. At block 190, the gamma correction function is performed on the R-G-B video signals in first look up table 68. The progressive scan function is performed in the R-G-B color space in processing modules 72a through 72c at block 192. The sharpness function is performed on the R, G and B video signals by processing modules 72a through 72c at block 194. At block 196, the contrast function is performed on the R, G, and B video signals in second look up table 70. Finally, the brightness function is performed on the R, G, and B video signals in second look up table 70 at block 198.

a. Hue

The hue function allows a user to make adjustments to the color of the video picture by a hue control input. The hue function may operate in either the color difference or R-G-B color space. The hue function may adjust video signals, such as Pr and Pb, in the color difference color space. Alternatively, the hue function may adjust R, G, and B video signals in the R-G-B color space. The hue control input may comprise an absolute value, X, and a sign value, S. The hue function may, for example, be operable to provide 256 adjustment levels in response to an eight bit X input.

In the color difference color space, the output of the hue function may be determined according to equation (21a):

$$\begin{bmatrix} Y \\ P_r' \\ P_b' \end{bmatrix} = \begin{bmatrix} A & B & C \\ D & E & F \\ G & H & I \end{bmatrix} \begin{bmatrix} Y \\ P_r' \\ P_b' \end{bmatrix} \quad (21a)$$

In equation (21a), the value for the variables A through I may be, for example:

A=1

B=0

C=0

D=0

E=cos X

F=S*sin X

G=0

H=-S,sin X; and

I=cos X.

In the R-G-B color space, the output of the hue function may be determined according to equation (21b):

$$\begin{bmatrix} G' \\ R' \\ B' \end{bmatrix} = \begin{bmatrix} A & B & C \\ D & E & F \\ E & H & I \end{bmatrix} \begin{bmatrix} G \\ R \\ B \end{bmatrix} \quad (21b)$$

The value for the variables A through I in equation 21(b) may vary depending on the color space from which the R, G, and B signals were derived. For example, when the R, G, and B values are converted from SMPTE 240M or SEMPTE 260M, the values of A through I may be:

A=0.2837 cos X−0.1251S* sin X+0.701

B=−0.2258 cos X−0.1394X* sin X0.087

C=−0.0579 cos X+0.2645S* sin X+0.212

D=−0.8124 cos X−0.7013X* sin X+0.701

E=−0.1006 cos X+0.913S* sin X+0.087

F=0.913 cos X−0.2116S* sin X+0.212

G=−0.6048 cos X+0.7015S* sin X+0.701

H=0.788 cos X+0.0863S* sin X+0.087

I=−0.1831 cos X−0.7878S* sin X+0.212

Alternatively, when the R, G, and B values are converted from NTSC values, the values of A through I may be:

A=1.1871 cos X+0.1066S* sin X−0.1871

B=−1.8116 cos X−1.024S* sin X+1.8115.

C=0.6244 cos X+0.9173S* sin X−0.6244

D=0.1871 cos X−0.714S* sin X−0.1871

E=−0.8115 cos X+1.0011S* sin X+1.8115

F=0.6244 cos X−0.2871S* sin X−0.6244

G=0.1871 cos X−2.1035S* sin X−0.1871

H=−1.8115 cos X+3.2113S* sin X+1.8115

I=1.6243 cos X−1.1077S* sin X−0.6244

Finally, when the R, G, and B values are converted from PAL or SECAM values, the values of A through I may be:

A=0.7009 cos X−0.1689S* sin X+0.2991

B=−0.5869 cos X−0.3292S* sin X 0.5868

C=−0.1141 cos X+0.4970sS* sin X+0.1141

D=−0.2991 cos X+0.3284S* sin X+0.2991

E=0.4132 cos X−0.0356S* sin X+0.5868

F=−0.1141 cos X−0.2929S* sin X+0.1141

G=−0.2991 cos X−1.2493S* sin X+0.2991

H=−0.5868 cos X+1.0461S* sin X+0.5868

I=0.886 cos X+0.2034S* sin X+0.1141

Figure 22:
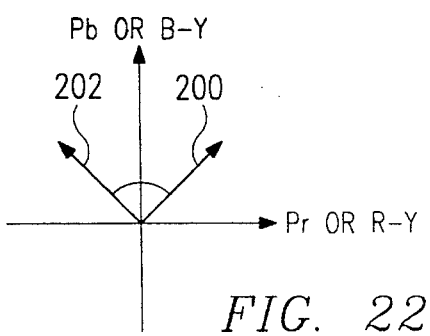
FIG. 22 is a graph showing the affect of a hue control input according to the teachings of the present invention.

The effect of a hue control input on the color values is shown graphically in FIG. 22. In FIG. 22, the symbols B-Y and R-Y refer to color difference signals in the R-G-B color space. The symbols Pr and Pb refer to color difference signals in a color difference color space. In operation, a vector representing the two color difference signals is rotated in the plane of FIG. 22. The amount and direction of rotation of the input hue vector is controlled by the X and S values of the hue control input. The result of the hue control function is an output vector 202.

b. Saturation

The saturation function allows a user to make adjustments to the color of the video picture by a saturation control input. The saturation function may operate in either the color difference or R-G-B color space. The saturation function may adjust video signals, such as Pr and Pb, in the color difference color space. Alternatively, the saturation function may adjust the R, G, and B video signals in the R-G-B color space. The saturation control input may comprise an absolute value, X, and a sign value, S. The saturation function may, for example, be operable to provide 256 adjustment levels in response to an eight bit X input.

In the color difference color space, the output of the saturation function is also determined according to equation (21a). In equation (21b), the value for the variables A through I may be, for example:

A=0

B=0

C=0

D=0

E=X+S

F=0

G=0

H=;0 and

I=X+S.

In the R-G-B color space, the output of the saturation function is determined according to equation (21b). The value for the variables A through I in equation (21b) may vary depending on the color space from which the R, G, and B signals were converted. For example, when the R, G, and B values are converted from SMPTE 240M or SEMPTE 260M, the values of A through I may be:

A=1+0.299SX

B=−0.087SX

C=−0.212SX

D=−0.701SX

E=1+0.913SX

F=−0.212SX

G=−0.701SX

H=−0.087SX

I=1+0.788SX

Alternatively, when the R, G, and B values are converted from NTSC values, the values of A through I may be:

A=1+1.1871SX

B=−1.8115SX

C=0.6244SX

D=0.1871SX

E=1−0.8115SX

F=0.6244SXSX

G=0.1871SX

H=−1.8115SX

I=1+1.6244SX

Finally, when the R, G, and B values are converted from PAL or SECAM values, the values of A through I may be:

A=1+0.7009SX

B=−0.5868SX

C=−0.1141SX

D=−0.2991

E=1+0.4132SX

F=−0.1141SX

G=−0.2991SX

H=−0.5868SX

I=1+0.8859SX

Figure 23:
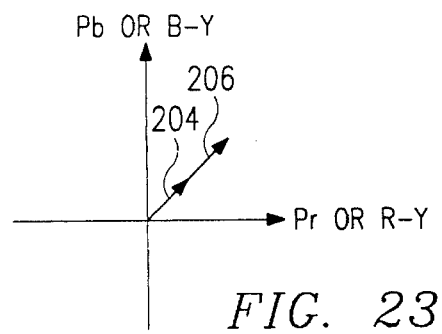
FIG. 23 is a graph showing the affect of a saturation control input according to the teachings of the present invention.

The effect of a saturation control input on the color values is shown graphically in FIG. 23. In FIG. 23, the symbols B-Y and R-Y refer to color difference signals in the Y, R-Y, B-Y space. The symbols Pr and Pb refer to the color difference signals in the SMPTE 240M color difference color space. In operation, a magnitude of a vector 204 representing the color difference signals is varied in the plane of FIG. 23. The amount and direction of change in the magnitude of the input saturation vector is controlled by the X and S values of the saturation control input. The result of the saturation control function is an output vector 206.

c. Sharpness

The sharpness function allows a user to make adjustments to a video picture by a sharpness control input. The sharpness function may operate in either the color difference or R-G-B color space. The sharpness function may adjust the luma, Y, video signal in the color difference color space. Alternatively, the sharpness function may adjust the R, G, and B video signals in the R-G-B color space. The sharpness control input may comprise an absolute value, X, and a sign value, S. The sharpness function may, for example, be operable to provide 256 adjustment levels in response to an eight bit X input.

Figure 24:
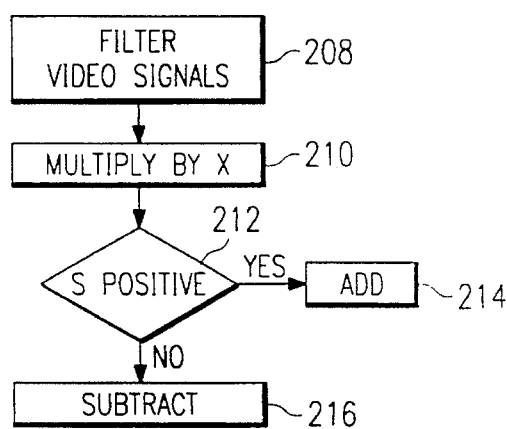
FIG. 24 is a flow chart that illustrates the operation of a sharpness function according to the teaching of the present invention.

FIG. 24 is a flow chart that illustrates the operation of the sharpness function according to the teachings of the present invention. The sharpness function may be implemented in processing modules 72a through 72c of FIG. 7. In a color difference color space, the sharpness function only operates on the Y video signal. In the R-G-B color space, the sharpness function may operate on each of the R, G, and B video signals.

At block 208, appropriate video signals may be filtered in a high pass filter. In a color difference color space, the filtered Y video signal for pixel A of FIG. 25 may be determined according to high pass filter equation (22):

$$Y = A/2 - B/8 - C/8 - D/8 - E/8 \tag{22}$$

Figure 25:
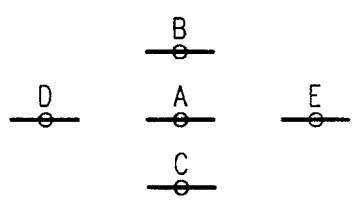
FIG. 25 illustrates a configuration of pixels used in the sharpness function according to the teaching of the present invention.

The values of A, B, C, D, and E in equation (22) correspond to the Y values for the pixels shown in FIG. 25. In the RGB color space, equation (22) may be applied to pixel A of FIG. 25 for each video signal R, G, and B.

Returning to FIG. 24, at block 210, the output of the high pass filter is multiplied by the value X of the sharpness control input. A decision is made at block 212 as to whether the value of S indicates a positive or a negative sharpness control input. If the value S of the sharpness control input corresponds to a positive sharpness control input, the result of the multiplication is added to the original video signals at block 214. Otherwise, the result of the multiplication is subtracted from the original video signals at block 216. The outputs of this operation are sharpness adjusted video signals.

d. Contrast

The contrast function allows a user to make adjustments to the color in the R-G-B color space of the video picture by a contrast control input. The contrast control input may comprise an absolute value, X, and a sign value, S. The contrast function may, for example, be operable to provide 256 adjustment levels in response to an eight bit X input.

Figure 26:
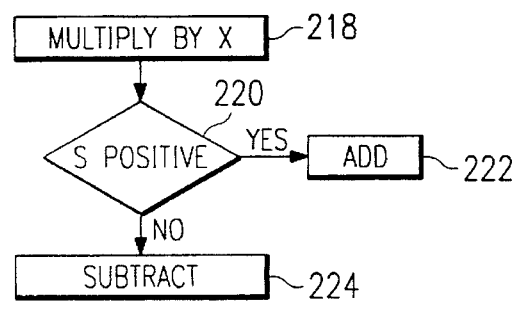
FIG. 26 is a flow chart that illustrates the operation of a contrast function according to the teachings of the present invention.

FIG. 26 is a flow chart that illustrates the operation of the contrast function according to the teachings of the present invention. The contrast function may be implemented in second look up table 70 of FIG. 7. At block 218, the three video signals in the R-G-B color space may be provided to a multiplier to multiply the video signals by the value X. At block 220, a decision is made as to whether the value of S indicates a positive or a negative contrast control input. The output of the multiplier is added to the original video signals at block 222 if the value of S corresponds to a positive contrast control input. Alternatively, the output of the multiplier is subtracted from the original video signals if S is negative at block 224.

Figure 27:
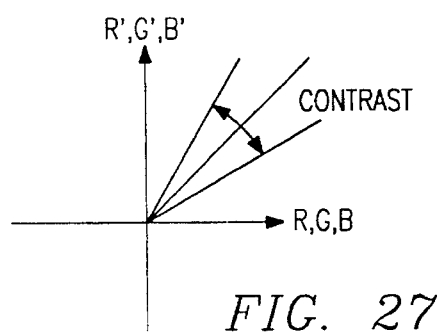
FIG. 27 is a graph illustrating the effect of the contrast function according to the teachings of the present invention.

The effect of the contrast function is shown graphically in FIG. 27. FIG. 27 graphs an input R, G, or B video signal against an output R', G', or B' video signal. In operation, the contrast control input alters the slope of the output/input curve.

e. Brightness

The brightness function allows a user to make adjustments to the color in the R-G-B color space of the video picture by a brightness control input. The brightness control input may comprise an absolute value, X, and a sign value, S. The brightness function may, for example, be operable to provide 256 adjustment levels in response to an eight bit X input. The brightness function may be implemented in second look up table 70 of FIG. 7. If the S value corresponds to a positive brightness control input, the brightness function adds X to each video signal, R, G, and B. Alternatively, the brightness function subtracts X from each video signal.

The effect of the brightness function is shown graphically in FIG. 28. In operation, the brightness function shifts the input/output curve such that the output is greater or less than the input by the value X.

D. Formatter

FIG. 29 illustrates an embodiment of a formatter indicated generally at 24' and constructed according to the teachings of the present invention. One formatter 24' of the type illustrated in FIG. 29 may be used for each of formatters 24a through 24c of FIG. 1. For conciseness, formatter 24' will be described in terms of formatter 24a of FIG. 1. It is understood that formatter 24' is not so limited, but may be used for formatters 24b and 24c as well.

Formatter 24' comprises line segment mapper 226 and data format unit 228. Line segment mapper 226 is coupled to two output lines from each channel signal processor 22a through 22d of FIG. 1. For example, line segment mapper 226 may be coupled to the two output lines corresponding to the red video signal from each channel signal processor 22a through 22d. Line segment mapper 226 is coupled to provide a number of outputs equal to the number of inputs to data format unit 228. Data format unit 228 provides four 32 bit output signals to display 26 of FIG. 1.

In operation, line segment mapper 226 receives processed video data for one of the video signals, such as, for example, the red video signal. The video signals received from channel signal processors 22a through 22d of FIG. 1 contain some overlap due to the manner in which line slicer 14 divides the input video signals as described previously with respect to FIG. 1. Line segment mapper 226 operates to remove the overlap in the various channels caused by line slicer 14. Once the overlap has been removed, the video signal is formatted, for example, for display 26a of FIG. 1 by data format unit 228. For example, data format unit 228 may create a series of bit planes wherein one bit of data in each bit plane corresponds to each pixel of display 26. Data format unit 228 may provide these bit planes to display 216 in 128 bit words as described below.

Figure 30:
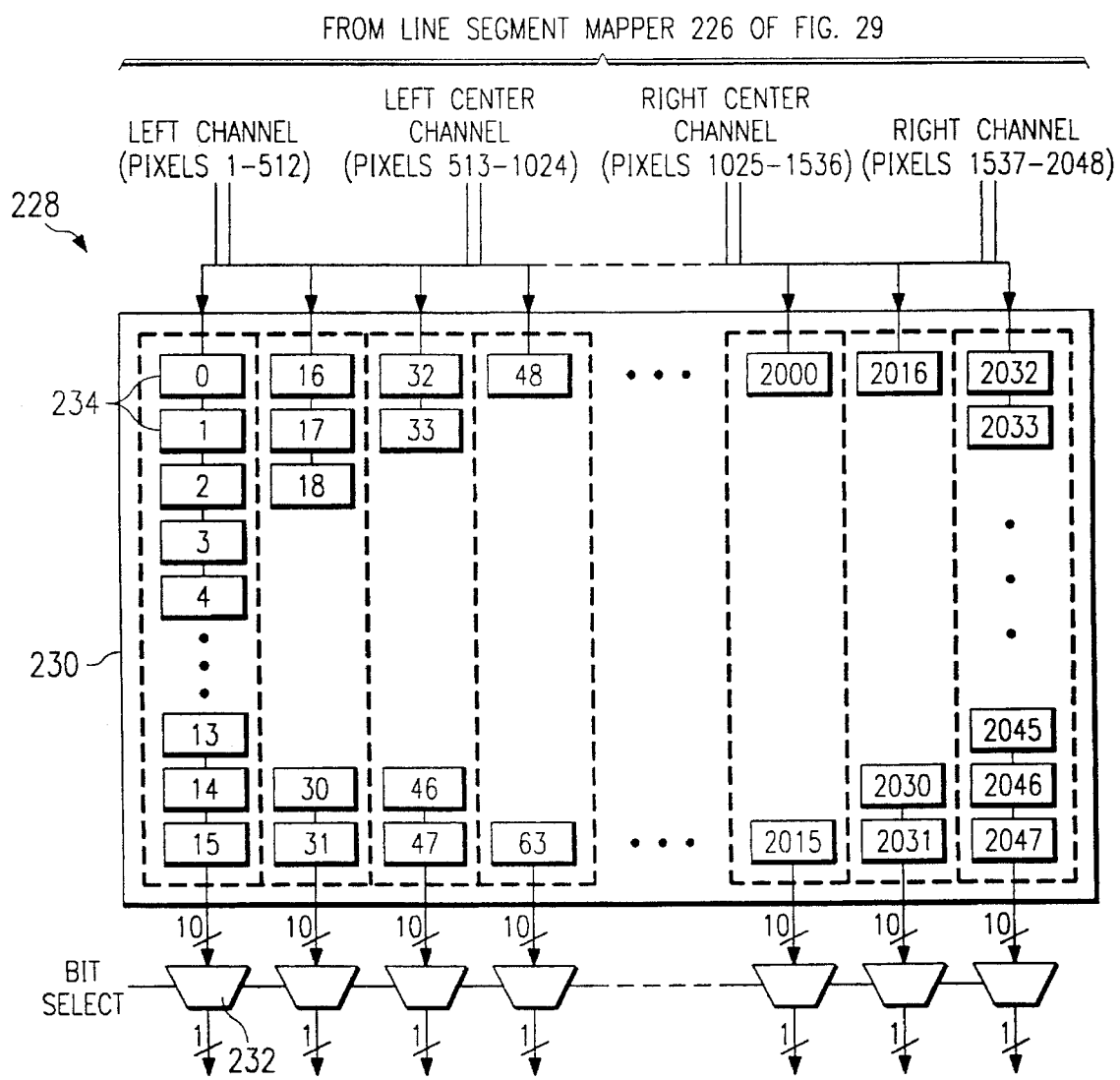
FIG. 30 illustrates an embodiment of a data format unit of FIG. 29 constructed according to the teachings of the present invention.

FIG. 30 illustrates an embodiment of a data format unit indicated generally at 228' and constructed according to the teachings of the present invention. Data format unit 228 comprises buffer memory 230 and a plurality of multiplexers 232. Plurality of multiplexers 232 may comprise, for example, 128 multiplexers controlled by a bit select signal from timing and control circuit 28 of FIG. 1. Buffer memory 230 is coupled to eight 10 bit outputs of line segment mapper 226 of FIG. 29.

Buffer memory 230 comprises a plurality of memory locations 234 equal in number to the number of pixels in a single line of video signal. Memory locations 234 may, for example, be oriented in 16 rows, each comprising 128 columns. Each multiplexer 232 may be coupled to an output of buffer memory 230 corresponding to a column of memory locations 234.

In operation, individual lines of video signal may be sequentially received and stored in memory locations 234 of buffer memory 230. Each memory location 234 comprises 10 bits of video data for one pixel in a single line of a video frame. The video data may be communicated to display 26a of FIG. 1 one line at a time to form 10 bit planes. A bit plane corresponds to one bit of data for each pixel in a video frame. Therefore, the first bit plane, for example, may correspond to the most significant bit for each pixel and the tenth bit plane may correspond to the least significant bit for each pixel.

Once the data for a first line of a video frame is stored in buffer memory 230, data format unit 228' may create the first line of the appropriate bit planes. Data format unit may communicate the first line of the ten bit planes in 128 bit words to display 26a of FIG. 1. For example, the first 128 bit word used in forming the first line of the first bit plane may correspond to the bottom row of memory locations 234 of buffer memory 230. The first bit of each memory location 234 in successive rows of buffer memory 230 may be used to create successive 128 bit words to fill out the first line of the first bit plane. The first line of a first bit plane is complete once all of the first bits stored in all of the rows of memory locations 234 have been used. This process may be repeated for successive bits in each memory location 234 until all of the data for a single line of video signal has been communicated to display 26 of FIG. 1. Thereby, the first line of each of the 10 bit planes of data for a single frame of video signal are communicated to display 26 of FIG. 1. The remaining lines of each of the ten bit planes associated with a frame of video may be communicated to display 26a of FIG. 1 by repeating the above process for each line in the video frame.

E. SLM

FIG. 31 illustrates an embodiment of a display indicated generally at 26' and constructed according to the teachings of the present invention. One display 26' of the type illustrated in FIG. 31 may be used for each display 26a through 26c of FIG. 1. For conciseness, display 26' will be described with respect to display 26a. It is understood that display 26' is not so limited, but may also be used for displays 26b and 26c. Display 26' comprises an SLM 236, and a plurality of Video Random Access Memories (hereinafter "VRAMs") 238. SLM 236 may comprise, for example, a 2×128 pin DMD produced by TEXAS INSTRUMENTS INCORPORATED or other appropriate display unit.

A DMD is a monolithic, micromechanical spatial light modulator having a plurality of pixels. A DMD may integrate discrete, tilting mirror elements with MOS addressing circuits at each pixel. The tilting mirror may be tilted to one of two appropriate binary positions by use of electrostatic attraction. In a first position, the tilting mirror of a particular pixel may reflect red, green or blue light, for example, at a display screen corresponding to the appropriate color at that pixel. In a second position, the tilting mirror of a particular pixel may not reflect any light at a display screen corresponding to a black pixel. Color shades may be obtained by controlling the amount of time a mirror corresponding to a particular pixel is in the first position. A DMD may, for example, be provided with appropriate mirrors to provide 2048 by 1152 pixels.

A plurality of VRAMs 238 may be coupled to receive video data corresponding to a video signal, for example, the red video signal, in 128 bit words from data format unit 228 of FIG. 30 as described above. Four individual VRAMs 238 may be coupled to each of four channels of SLM 236. Each channel of SLM 236 may have a width of 512 pixels in each channel. Two VRAMs 238 may be coupled to a first half of each channel of SLM 236 and two VRAMs 238 may be coupled to a second half of SLM 236. Ultimately, VRAMs 238 store and communicate successive sets of 10 bit planes to SLM 236.

In operation, SLM 236 may reflect, for example, red light from an appropriate light source (not explicitly shown) at a screen (not explicitly shown) so as to display video images corresponding to the processed video data. The amount of light reflected by SLM 236 for a particular frame of video may be controlled by the 10 bit planes stored in VRAMs 238. For example, a bright red color may be reflected by a particular pixel of SLM 236 by tilting the mirror for that pixel to the first, or reflecting, position for the length of time corresponding to a video frame. The brightness of the pixel may be varied by controlling the time that the mirror is in the first position.

The time that each mirror is in the first position may be controlled by the 10 bit planes of VRAMs 238. For example, each bit plane may control the binary location of each mirror for a portion of the time corresponding to a video frame. The bit plane corresponding to the most significant bit may control SLM 236 for one-half of the time corresponding to a video frame. Each successive bit plane may then control SLM 236 for decreasing amounts of time in proportion to the position of the bits of that bit plane in the original 10 bit word corresponding to each pixel. In this manner, SLM 236 may display appropriate video images. The combination of the red, green and blue light reflected by displays 26a through 26c of FIG. 1 results in the display of the processed video signal.

Although the present invention has been described in detail, it should be understood that various changes, substitutions and alterations may be made hereto without departing from the spirit and scope of the invention as defined by the appended claims. For example, it is within the teachings of the present invention to display the processed video on an analog display. Additionally, any number of other digital displays may be used such as a liquid crystal display. Additionally, a single memory component may be used to control each of first, second, and third displays 26a through 26c. Furthermore, the number of channels provided in processing circuitry 20 may be varied without departing from the spirit and scope of the present invention. Additionally, the type of processing performed by processing circuitry may similarly be varied without departing from the scope of the teachings of the present invention.

What is claimed is:

1. A digital television system, comprising:
   circuitry operable to divide a line of input video signals into a plurality of channels for each input video signal;
   circuitry responsive to said dividing circuitry and operable to simultaneously process said channels of input video signals; and
   at least one spatial light modulator responsive to said processing circuitry and operable to display said processed input video signals, wherein said modulator displays said processed input video signals by controlling individual elements of an array on said modulator.

2. The system of claim 1, wherein said dividing circuitry comprises a line slicer operable to divide a line of input video signals into four channels for each input video signal.

3. The system of claim 1, wherein said dividing circuitry comprises a line slicer operable to divide a line of input video signals into five channels for each input video signal.

4. The system of claim 1, wherein, for each channel created by said dividing circuitry, said processing circuitry comprises a video signal processor operable to convert each line of input video signal into two lines of input video signal, to control sharpness, hue, saturation, contrast, and brightness of said video input signals, to convert said input video signals from one color space to another color space, and to remove a gamma curve from said input video signals.

5. The system of claim 1, wherein, for each channel created by said dividing circuitry, said processing circuitry comprises:
   a matrix multiplication circuit responsive to said processing circuitry and operable to convert said input video signals from one color space to another color space, and operable to control hue and saturation of said input video signals;
   a look up table responsive to said matrix multiplication circuit and operable to remove a gamma curve from said input video signals, and operable to control contrast and brightness of said input video signals; and at least one scan line video processor responsive to said first look up table and operable to convert each line of input video signal into two lines of input video signal, and operable to control sharpness of said input video signals.

6. The system of claim 1, wherein, for each channel created by said dividing circuitry, said processing circuitry comprises:

at least one scan line video processor responsive to said dividing circuitry and operable to convert each line of input video signal into two lines of input video signal, and operable to control sharpness of said input video signals;

a matrix multiplication circuit responsive to said scan line video processors and operable to convert said input video signals from one color space to another color space, and operable to control hue and saturation of said input video signals; and a look up table responsive to said matrix multiplication circuit and operable to remove a gamma curve from said input video signals, and operable to control contrast and brightness of said input video signals.

7. The system of claim 1, wherein, for each channel created by said dividing circuitry, said processing circuitry comprises:

a matrix multiplication circuit responsive to said dividing circuitry and operable to convert said input video signals from one color space to another color space, and operable to control hue and saturation of said input video signals;

at least one scan line video processor responsive to said matrix multiplication circuit and operable to convert each line of input video signal into two lines of input video signal, and operable to control sharpness of said input video signals; and a look up table responsive to said scan line video processor and operable to remove a gamma curve from said input video signals, and operable to control contrast and brightness of said input video signals.

8. The system of claim 1, wherein, for each channel created by said dividing circuitry, said processing circuitry comprises:

a look up table responsive to said dividing circuitry and operable to remove a gamma curve from said input video signals, and operable to control contrast and brightness of said input video signals;

at least one scan line video processor responsive to said look up table and operable to convert each line of input video signal into two lines of input video signal, and operable to control sharpness of said input video signals; and a matrix multiplication circuit responsive to said scan line video processors and operable to convert said input video signals from one color space to another color space, and operable to control hue and saturation of said input video signals.

9. The system of claim 1, wherein, for each channel created by said dividing circuitry, said processing circuitry comprises:

a first matrix multiplication circuit responsive to said dividing circuitry and operable to convert said input video signals from one color space to another color space, and operable to control hue and saturation of said input video signals;

a first look up table responsive to said first matrix multiplication circuit and operable to remove a gamma curve from said input video signals, and operable to control contrast and brightness of said input video signals;

at least one scan line video processor responsive to said first look up table and operable to convert each line of input video signal into two lines of input video signal, and operable to control sharpness of said input video signals;

a second matrix multiplication circuit responsive to said scan line video processors and operable to convert said input video signals from one color space to another color space, and operable to control hue and saturation of said input video signals; and a second look up table responsive to said second matrix multiplication circuit and operable to remove a gamma curve from said input video signals, and operable to control contrast and brightness of said input video signals.

10. The system of claim 1, wherein said modulator comprises one spatial light modulator array for each input video signal.

11. The system of claim 1, wherein an array of said modulator comprises one digital micromirror device for each input video signal.

12. The system of claim 1, and further comprising circuitry coupled to said dividing circuitry and operable to receive a composite video signal from a standard video source and to convert said composite video signal to a plurality of digital input video signals.

13. The system of claim 1, and further comprising circuitry responsive to said processing circuitry and coupled to said displaying circuitry and operable to format said processed input video signals for said display.

14. A high definition digital television system, comprising:

circuitry operable to receive a video signal and to provide a plurality of digital video signals;

circuitry responsive to said receiving circuitry and operable to divide a line of said digital video signals into a plurality of channels for each digital video signal;

circuitry responsive to said dividing circuitry and operable to simultaneously process said channels of digital video signals; and a spatial light modulator responsive to said processing circuitry and operable to display said processed digital video signals by controlling individual elements of an array of said modulator.

15. The system of claim 14, and further comprising circuitry responsive to said processing circuitry and operable to format said processed digital video signals for said displaying circuitry.

16. The system of claim 14, wherein said dividing circuitry comprises a line slicer operable to divide a line of digital video signals into four channels for each digital video signal.

17. The system of claim 14, wherein said dividing circuitry comprises a line slicer operable to divide a line of digital video signals into five channels for each digital video signal.

18. The system of claim 14, wherein, for each channel created by said dividing circuitry, said processing circuitry comprises a video signal processor operable to convert each line of input video signal into two lines of input video signal, to control sharpness, hue, saturation, contrast, and brightness of said video signals, to convert said input video signals from one color space to another color space, and to remove a gamma curve from said input video signals.

19. The system of claim 14, wherein, for each channel created by said dividing circuitry, said processing circuitry comprises:
- a matrix multiplication circuit responsive to said processing circuitry and operable to convert said digital video signals from one color space to another color space, and operable to control hue and saturation of said digital video signals;
- a look up table responsive to said matrix multiplication circuit and operable to remove a gamma curve from said digital video signals, and operable to control contrast and brightness of said digital video signals; and
- at least one scan line video processor responsive to said first look up table and operable to convert each line of digital video signal into two lines of digital video signal, and operable to control sharpness of said digital video signals.

20. The system of claim 14, wherein, for each channel created by said dividing circuitry, said processing circuitry comprises:
- at least one scan line video processor responsive to said dividing circuitry and operable to convert each line of digital video signal into two lines of digital video signal, and operable to control sharpness of said digital video signals;
- a matrix multiplication circuit responsive to said scan line video processors and operable to convert said digital video signals from one color space to another color space, and operable to control hue and saturation of said digital video signals; and
- a look up table responsive to said matrix multiplication circuit and operable to remove a gamma curve from said digital video signals, and operable to control contrast and brightness of said digital video signals.

21. The system of claim 14, wherein, for each channel created by said dividing circuitry, said processing circuitry comprises:
- a matrix multiplication circuit responsive to said dividing circuitry and operable to convert said digital video signals from one color space to another color space, and operable to control hue and saturation of said digital video signals;
- at least one scan line video processor responsive to said matrix multiplication circuit and operable to convert each line of digital video signal into two lines of digital video signal, and operable to control sharpness of said digital video signals; and
- a look up table responsive to said scan line video processor and operable to remove a gamma curve from said digital video signals, and operable to control contrast and brightness of said digital video signals.

22. The system of claim 14, wherein, for each channel created by said dividing circuitry, said processing circuitry comprises:
- a look up table responsive to said dividing circuitry and operable to remove a gamma curve from said digital video signals, and operable to control contrast and brightness of said digital video signals;
- at least one scan line video processor responsive to said look up table and operable to convert each line of digital video signal into two lines of digital video signal, and operable to control sharpness of said digital video signals; and
- a matrix multiplication circuit responsive to said scan line video processors and operable to convert said digital video signals from one color space to another color space, and operable to control hue and saturation of said digital video signals.

23. The system of claim 14, wherein, for each channel created by said dividing circuitry, said processing circuitry comprises:
- a first matrix multiplication circuit responsive to said dividing circuitry and operable to convert said digital video signals from one color space to another color space, and operable to control hue and saturation of said digital video signals;
- a first look up table responsive to said first matrix multiplication circuit and operable to remove a gamma curve from said digital video signals, and operable to control contrast and brightness of said digital video signals;
- at least one scan line video processor responsive to said first look up table and operable to convert each line of digital video signal into two lines of digital video signal, and operable to control sharpness of said digital video signals;
- a second matrix multiplication circuit responsive to said scan line video processors and operable to convert said digital video signals from one color space to another color space, and operable to control hue and saturation of said digital video signals; and
- a second look up table responsive to said second matrix multiplication circuit and operable to remove a gamma curve from said digital video signals, and operable to control contrast and brightness of said digital video signals.

24. The system of claim 14, wherein said displaying circuitry comprises one spatial light modulator for each digital video signal.

25. The system of claim 14, wherein said spatial light modulator comprises one digital micromirror device for each digital video signal.

26. A method for creating a high definition video display from a standard video signal, comprising the steps of:
- separating a standard composite video signal into a plurality of video signals;
- sampling the separated video signals to create digital video signals;
- dividing said digital video signals into a plurality of channels;
- processing the plurality of channels of digital video signals in parallel; and
- displaying the processed digital video signals as a high definition display, by using processed data from said plurality of channels to control individual elements of a spatial light modulator array.

27. The method of claim 26, and further comprising the step of formating the process digital video signals for a display.

28. The method of claim 26, wherein said step of sampling the separated video signals to create digital video signals comprises the step of sampling the separated video signals to create digital video signals in an analog to digital converter.

29. The method of claim 26, wherein said step of dividing said digital video signals into a plurality of channels comprises the step of dividing said digital video signals into four channels.

30. The method of claim 26, wherein said step of dividing said digital video signals into a plurality of channels comprises the step of dividing said digital video signals into five channels.

31. The method of claim 26, wherein said step of processing the plurality of channels of digital video signals in parallel comprises the step of processing the plurality of channels in a scan line video processor.

32. The method of claim 26, wherein said step of displaying the formatted digital video signals comprises the step of displaying the formatted digital video signals on a spatial light modulator display.

* * * * *